United States Patent
Christiansen

(10) Patent No.: US 7,421,317 B2
(45) Date of Patent: Sep. 2, 2008

(54) TWO-WIRE CONTROLLING AND MONITORING SYSTEM FOR THE IRRIGATION OF LOCALIZED AREAS OF SOIL

(75) Inventor: Tom N. Christiansen, Hørsholm (DK)

(73) Assignee: S-Rain Control A/S, Kvistgaard (DK)

( * ) Notice: Subject to any disclaimer, the term of this patent is extended or adjusted under 35 U.S.C. 154(b) by 249 days.

(21) Appl. No.: 11/283,505

(22) Filed: Nov. 18, 2005

(65) Prior Publication Data

US 2006/0116793 A1 Jun. 1, 2006

Related U.S. Application Data

(63) Continuation-in-part of application No. 10/886,395, filed on Jul. 7, 2004, now Pat. No. 6,993,416, which is a continuation of application No. 09/721,461, filed on Nov. 22, 2000, now Pat. No. 6,766,221, which is a continuation of application No. PCT/DK00/00635, filed on Nov. 15, 2000.

(30) Foreign Application Priority Data

Nov. 25, 1999 (EP) .................................. 99610074

(51) Int. Cl.
*G05D 7/00* (2006.01)
*G05D 11/00* (2006.01)
*F16K 17/36* (2006.01)
*F16K 31/00* (2006.01)
*G05B 11/00* (2006.01)

(52) U.S. Cl. .......................... 700/284; 137/78.2; 239/69

(58) Field of Classification Search ................. 700/284; 137/78.2; 239/63, 67, 69
See application file for complete search history.

(56) References Cited

U.S. PATENT DOCUMENTS

| | | | |
|---|---|---|---|
| 3,723,753 A | 3/1973 | Davis | |
| 4,004,612 A | 1/1977 | Hummel, Jr. et al. | |
| 4,007,458 A | 2/1977 | Hollabaugh | |
| 4,131,882 A | 12/1978 | Hollabaugh et al. | |
| 4,176,395 A | 11/1979 | Evelyn-Veere et al. | |
| 4,535,401 A | 8/1985 | Penn | |
| 5,023,787 A | 6/1991 | Evelyn-Veere | |
| 5,434,774 A | 7/1995 | Seberger | |
| 5,570,030 A | 10/1996 | Wightman | |
| 5,839,658 A | 11/1998 | Sarver | |
| 5,848,609 A | 12/1998 | Marchesseault et al. | |

(Continued)

*Primary Examiner*—Ryan A Jarrett
(74) *Attorney, Agent, or Firm*—Klein, O'Neill & Singh, LLP

(57) ABSTRACT

A controlling and monitoring system for irrigation of localized areas of soil includes a water pipeline, a plurality of controllable irrigation valves, a plurality of field sensors measuring specific irrigation parameters, and a plurality of localized irrigation control units. Each of the control units has a sensor decoder connected to a specific one of the field sensors and a line decoder connected to a specific one of the irrigation valves. The system further includes a controller and power supply unit that applies a first alternating DC voltage signal to a two-wire cable interconnecting the controller and power supply unit and the control units. The cable provides power from the controller and power supply unit to each of the control units. The controller and power supply unit transmits schedules of instructions to the control units, and receives the irrigation parameters from the control units, through the cable.

46 Claims, 17 Drawing Sheets

U.S. PATENT DOCUMENTS

| | | |
|---|---|---|
| 6,402,048 B1 | 6/2002 | Collins |
| 6,766,221 B1 | 7/2004 | Christiansen |
| 6,993,416 B2 * | 1/2006 | Christiansen ............... 700/284 |
| 7,084,741 B2 | 8/2006 | Plummer |
| 7,146,255 B2 * | 12/2006 | Christiansen ............... 700/284 |
| 7,206,669 B2 * | 4/2007 | Christiansen ............... 700/284 |
| 2004/0130378 A1 | 7/2004 | Kihara |

* cited by examiner

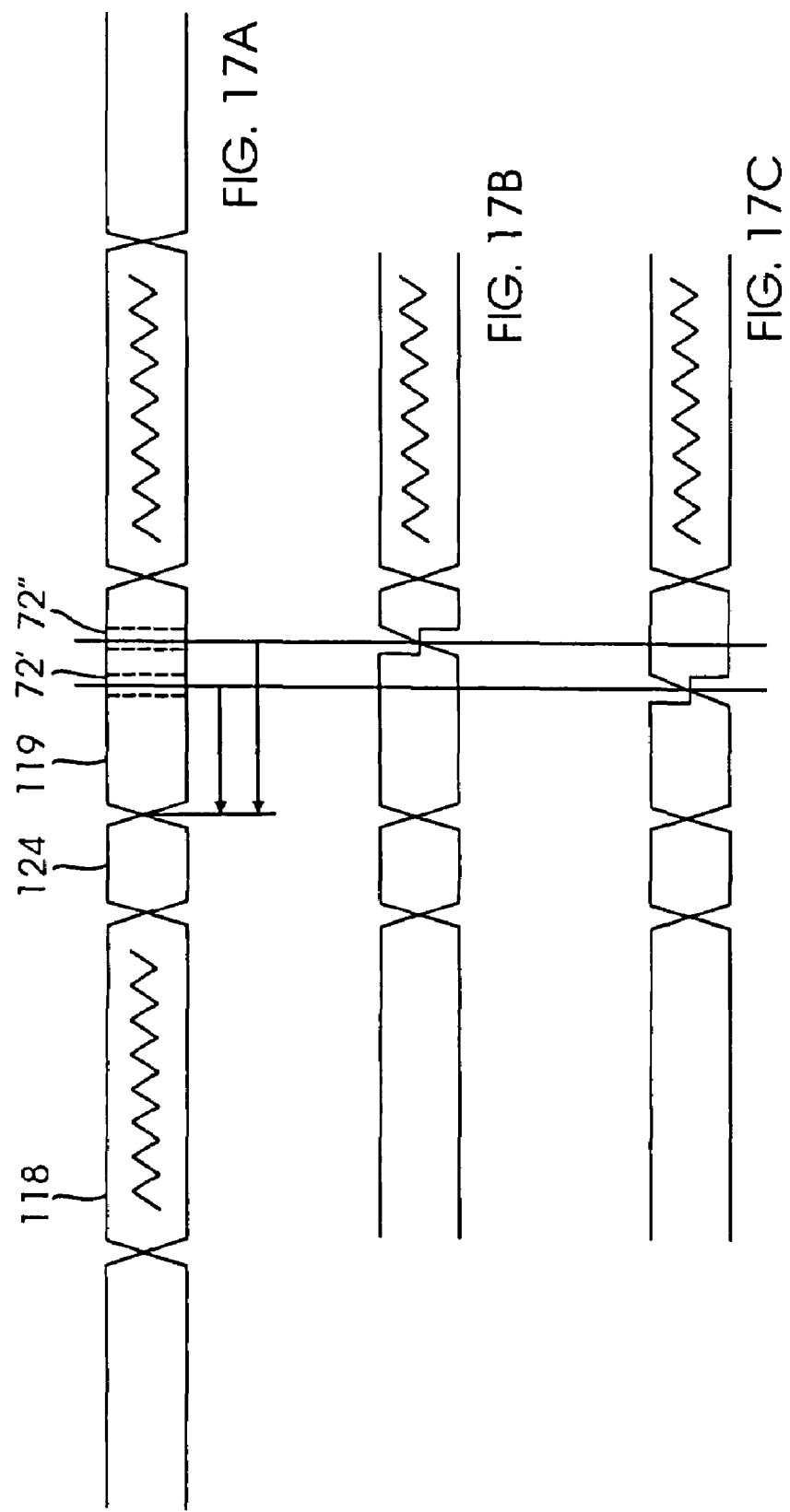

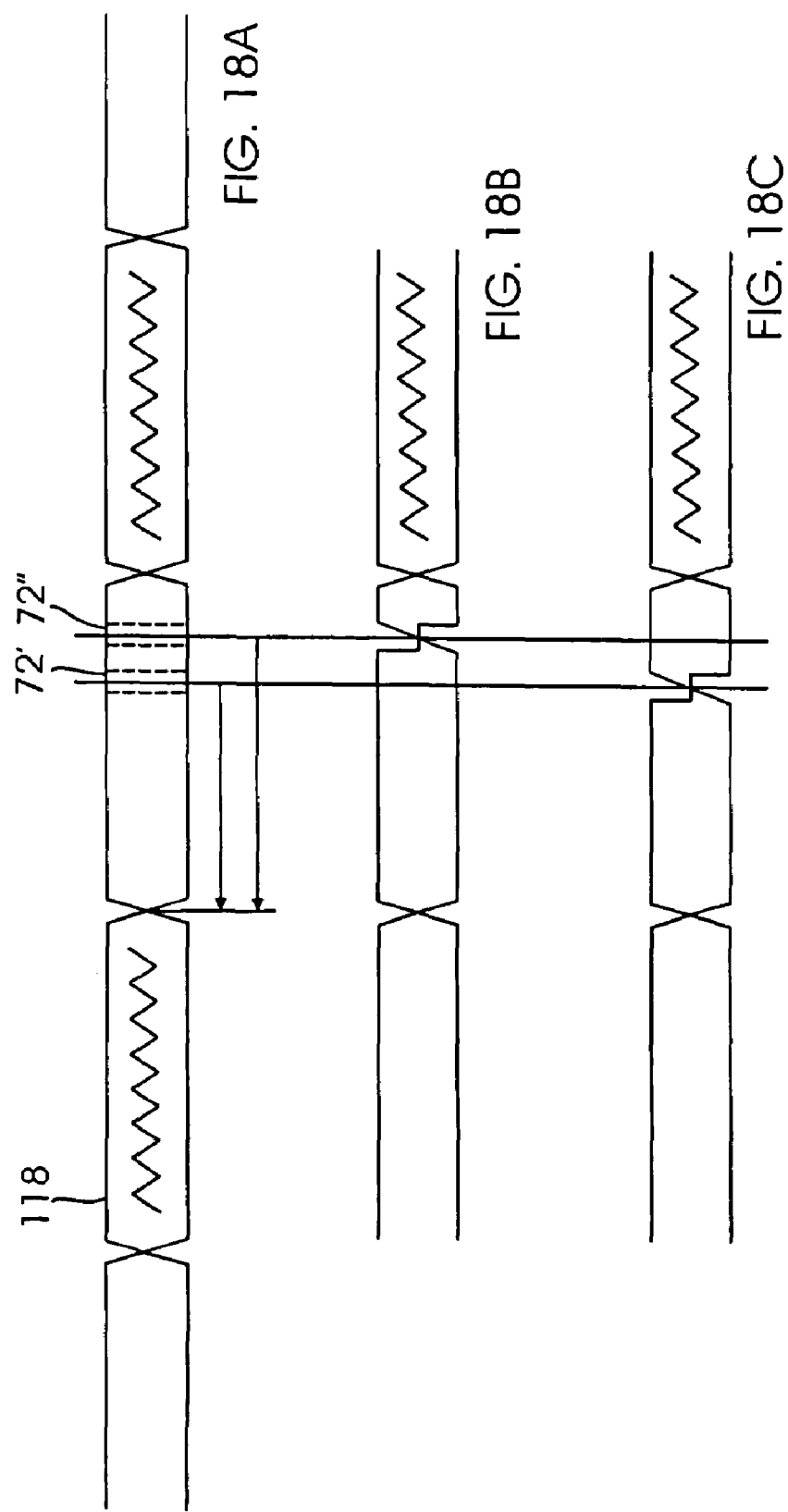

TWO-WIRE CONTROLLING AND MONITORING SYSTEM FOR THE IRRIGATION OF LOCALIZED AREAS OF SOIL

CROSS-REFERENCE TO RELATED APPLICATIONS

This application is a Continuation-in-Part of U.S. application Ser. No. 10/886,395, filed Jul. 7, 2004, now U.S. Pat. No. 6,993,416, which is a Continuation of U.S. application Ser. No. 09/721,461, filed Nov. 22, 2000, now U.S. Pat. No. 6,766,221, which is a Continuation of International Application No. PCT/DK00/00635, filed Nov. 15, 2000. The disclosures of these prior applications are incorporated herein by reference,

FEDERALLY SPONSORED RESEARCH OR DEVELOPMENT

Not Applicable

BACKGROUND OF THE INVENTION

This invention relates generally a two-wire controlling and monitoring system particularly for irrigation of localized areas of soil.

The most commonly known two-wire irrigation control systems, such as control systems described in U.S. Pat. Nos. 3,723,753, 4,004,612, 4,007,458, 4,131,882, 4,176,395, 4,535,401, 5,570,030 and 5,848,609 to which reference is made and which are hereby incorporated in the present specification by reference, provide control of a number of remotely located irrigation or sprinkler valves from a central location by means of control signals encoded on to a single pair of power transmission lines linking a central encoder and a number of remote decoders.

The two-wire irrigation control system according to U.S. Pat. No. 4,007,458 encodes and transmits an address of a specific remotely located irrigation valve and on/off signals onto an alternating current signal (AC) by clipping half portions of the signal to represent zero values.

Similarly the two-wire interactive irrigation control system according to U.S. Pat. No. 4,176,395 transmits data by selectively clipping the original power frequency signal during eight consecutive cycles, suppressing the power frequency signal during the following full cycle, during which time a feedback signal may be transmitted from sensors located at specific areas, then transmitting eight undistorted power frequency cycles, and suppressing the power frequency signal for one following cycle, during which time a feedback signal relating to a portable operator may be transmitted.

Both two-wire irrigation control systems according to U.S. Pat. Nos. 4,007,458 and 4,176,395 communicate to remotely located irrigation valves or decoders by clipping of the power signals. Consequently, while performing a transmission on the power line, power to the remotely located irrigation valves or decoders is significantly reduced.

Furthermore, the two-wire irrigation control systems according to U.S. Pat. Nos. 4,007,458 and 4,176,395 utilize sinusoidal signals for transmitting power to remotely located irrigation valves or decoders. Sinusoidal signals, being AC signals, generally need to be converted into DC in order to drive microprocessor electronic circuitry, adding total costs to the two-wire irrigation systems for the electronics incorporated in the remotely located irrigation valves or decoders.

SUMMARY OF THE INVENTION

An object of the present invention is to provide a two-wire controlling and monitoring system particularly for controlling a plurality of controllable irrigation or sprinkler valves placed at specific localized areas, monitoring specific irrigation parameters at the specific localized areas, and communicating through a two-wire cable with line and sensor decoders located at the specific localized areas, while limiting the above-described power loss due to signalling on the two-wire cable.

A particular advantage of the present invention is the utilization of a power supply signal for the operation of the controllable irrigation valves, hence performing an improved power transmission within general safety specifications.

A particular feature of the present invention is an improved corrosion resistance.

The above object, the above advantage and the above feature, together with numerous other objects, advantages and features, which will be evident from the below detailed description of a preferred embodiment of the present invention is, according to a first aspect of the present invention, obtained by a two-wire controlling and monitoring system particularly for irrigation of localized areas of soil and comprising:

a water pipeline providing water to said localized areas of soil, a first plurality of controllable irrigation valves each positioned at a specific area of said localized areas of soil, communicating with said water pipeline, providing watering or non-watering of said specific area of said localized areas of soil and having a pair of valve control inputs, a second plurality of field sensors positioned at specific areas of said localized areas of soil, providing specific irrigation parameters and having a pair of sensor outputs, a third plurality of localized irrigation control units each comprising a sensor decoder having a pair of sensor inputs connected to said pair of sensor outputs of a specific field sensor of said second plurality of field sensors for providing power to said second plurality of field sensors, and recording said specific irrigation parameters from said second plurality of field sensors and/or a line decoder having a pair of valve control outputs connected to said pair of valve control inputs of a specific controllable irrigation valve of said first plurality of controllable irrigation valves for providing valve control signals to said first plurality of controllable irrigation valves, said sensor decoder and said line decoder further each having a pair of control and power supply inputs, a controller and power supply unit having a set of schedules of instructions and having a pair of control and power outputs supplying power by applying a first alternating DC voltage signal defining a voltage maximum having a first pulse width and defining a voltage minimum having a second pulse width to one of said pair of control and power outputs, simultaneously applying a second alternating DC voltage signal similarly shaped but of inverted polarity as compared to said first alternating DC voltage signal to another of said pair of control and power outputs, and applying an alternating DC current defining a current maximum having a third pulse width and defining a current minimum having a fourth pulse width to said pair of control and power outputs, a two-wire cable interconnecting said controller and power supply unit and said third plurality of localized irrigation control units and connecting said pair of control and power outputs of said controller and power supply unit to said control and power inputs of said third plurality of localized irrigation control units and providing said power from said controller and power supply unit to each of said third plurality of localized irrigation control units, and said controller and power supply unit transmitting said schedules of instructions to said third plurality of localized irrigation control units through said two-wire cable and receiving said specific irrigation parameters from said third plurality of localized irrigation control units through said two-wire cable.

According to the basic realization of the first aspect of the present invention, the application of two alternating DC voltage signals having respectively inverted polarity on to the two-wire cable provides an improved power transmission with respect to the prior art's application of sinusoidal voltage signals. The improvement is approximately by a factor of 2. Sinusoidal voltage signals, although ideal for some purposes, impose a restriction on maximum attainable power transmission during a time frame caused by the inherent shape of the voltage signal squared as compared to a square wave voltage signal squared. Furthermore, by relying on slow alternating DC voltage signals for powering of the decoders instead of relying on sinusoidal voltage signals having standard 50 Hz or 60 Hz network frequencies, a less noise sensitive and subsequently cheaper circuit may be implemented, since relatively little attention should be given to noise considerations. Additionally, the square wave structure of the alternating DC voltage signal provides an ideal platform for carrying binary information, which will be further described below.

The water pipeline characteristic of the two-wire irrigation controlling and monitoring system according to the first aspect of the present invention may be wholly or partly buried underground, or the water pipeline may be placed on the ground. Parts of the pipelines being above ground level provide movable sections that may easily be moved into positions according to the conditions of the local areas. Furthermore the water pipeline is constructed from plastic materials or metal materials such as iron, steel, copper, silver, gold or any alloys thereof in any combinations thereof. Generally plastic pipes are favourable, since the price is low with respect to metal material pipes and since plastic pipes are more flexible, rendering it possible to rearrange the layout of the pipes without causing excessive expenses.

The first plurality of controllable irrigation valves according to the first aspect of the present invention are magnetically, electrically, hydraulically or pneumatically operated or combinations thereof. The first plurality of controllable irrigation valves according to the first aspect of the present invention is preferably electrically operated and opened by applying an inrush voltage or current signal followed by a hold voltage or current signal to the pair of valve control inputs, and closed by applying no voltage or current signal to the pair of valve control inputs. Further according to the first aspect of the present invention, the line decoders provide the inrush voltage, the hold voltage and the zero voltage to the first plurality of controllable irrigation valves by supplying from the pair of valve control outputs a pulsed alternating DC control signal to the pair of valve control inputs in accordance with the transmitted schedules of instructions. The pulsed alternating DC voltage signal defines a maximum differential voltage in the range of 25V to 45V (preferably about 35V), a minimum differential voltage in the range of 0V to 5V (preferably about 0V), and a line decoder output pulse width in the range of 10 microseconds to 0.1 second (preferably about 1 millisecond). The line decoder output pulse width defines a first part having the maximum differential voltage and a second part having the minimum differential voltage. The pulsed alternating DC voltage signal constitutes the inrush voltage by having the first part longer than or equal to the second part during a period in the range 10 milliseconds to 1 second, and constitutes the hold voltage by having the first part shorter than the second part during a period determined in accordance with the schedule of instructions transmitted to the line decoders by the controller and power supply unit. The parts may have any particular lengths to provide for any composition of signals generating a wide variety of average voltages; however the composition described above is optimal for driving an electrically driven irrigation valve with respect to power consumption of the line decoder.

The first pulse width of the first and second alternating DC voltage signals according to the first aspect of the present invention may be equal to the second pulse width, or smaller than the second pulse width, or greater than the second pulse width. Preferably the first pulse width is substantially equal to the second pulse width, thereby constituting a square wave voltage signal.

The first alternating DC voltage signal and the second alternating DC voltage signal according to the first aspect of the present invention alternate with a frequency less than the AC line frequency of power networks (typically 50 Hz or 60 Hz). The first pulse width of the first alternating DC voltage signal and the second alternating DC voltage signal is in the range 100 milliseconds to 10 seconds (preferably about 500 milliseconds), and the second pulse width of the first alternating DC voltage signal and the second alternating DC voltage signal is in the range 100 milliseconds to 10 seconds (preferably about 500 milliseconds). By reducing frequency of alternation, toggling or inversion of the first and the second alternating DC voltage signals, the noise sensitivity of the circuitry is reduced, and furthermore the tolerances as to acceptable accuracy of pulse widths are shifted from the microsecond range to the millisecond range.

The first alternating DC voltage signal and the second alternating DC voltage signal according to the first aspect of the present invention during the first pulse width and the second pulse width have average voltages greater than or equal to zero voltage. Alternatively, the first alternating DC voltage signal and the second alternating DC voltage signal during the first pulse width and the second pulse width have average voltages less than or equal to zero voltage. In particular the first alternating voltage signal and the second alternating voltage signal during the first pulse width and the second pulse width have an average voltage in the range $-5V$ to $-0.5V$ (preferably $-2V$). The voltage maximum of the first and second alternating DC voltage signals according to the first aspect of the present invention is in a range from $+10V$ to $+20V$ (preferable $+15V$), and the voltage minimum in a range from $-15V$ to $-25V$ (preferable $-20V$). By applying a numerically larger minimum voltage compared to the maximum voltage offsetting the average voltage below ground voltage, the risk of deterioration of the two-wire cable caused by corrosion is significantly reduced, since the deterioration of the two-wire cable at locations where the presence of an insulating layer around the two-wire cable has been damaged will be based on an alkaline process. The alkaline process donates electrons to the ground level due to the voltage difference and accepts a layer of ions substituting the missing electrons, and thus the layer of ions creates a saturation layer at the exposed part of the two-wire cable, reducing further corrosion of the two-wire cable.

The maximum current according to the first aspect of the present invention is in the range of 0.5 A to 2 A (preferably 1.1 A), and the minimum current is in the range 20 mA to 150 mA (preferably 40 mA). Additionally, the third pulse width defining a part of the alternating DC current signal is greater than the fourth pulse width, and the fourth pulse width defining another part of the alternating DC current signal is in the range 0.1 millisecond to 10 milliseconds; preferably the fourth pulse width is shorter than 5 milliseconds. The alternating DC current signal provides low current sequences during which communication may be performed from irrigation control units placed at specific locations to the controller and power supply unit.

Communication from the controller and power supply unit to the irrigation control units placed at specific locations may consist of schedules of instructions according to the first aspect of the present invention. The schedules of instructions are transmitted onto the two-wire system by re-scaling the first pulse width or the second pulse width of the first and second alternating DC voltage signals to a fifth pulse width in the range 10 milliseconds to 49 milliseconds (preferably 20 milliseconds), indicating a binary "1", or by re-scaling the first pulse width or the second pulse width of the first and second alternating DC voltage signals to a sixth pulse width in the range 0.5 millisecond to 9 milliseconds (preferably 5 milliseconds), indicating binary "0". Modulating the pulse width of the first and second alternating DC voltage signals instead of clipping of portions of the voltage signals significantly improves power transmission from the controller and power supply unit to the irrigation control units, while providing ingenious means for communication.

The transmitted schedules of instructions according to the first aspect of the present invention comprise a type declaration determining additional content of a transmission from the controller and power supply unit to the third plurality of localized irrigation control units. The additional content, such as an address of a specific designated localized irrigation control unit of the third plurality of localized irrigation control units, data disclosing information regarding actions to be taken by the specific designated localized irrigation control unit of the third plurality of localized irrigation control units and/or a first check and a second check ensuring a safe reception of the transmission, is terminated by a stop signal having a seventh pulse width. The seventh pulse width is in the range 50 milliseconds to 70 milliseconds (preferably 60 milliseconds). The content of transmissions may have numerous purposes and achieve numerous tasks and provide means for performing a wide variety of transmissions comprising a plurality of information types.

The above described type declaration comprising 4 bits provides 16 optional operations such as Arbitration, Data, Control (On/Off), Broadcast, Test and Pole, leaving room for up to ten more possible operations, which according to today's needs, is sufficient. However, an increase of the transmission size of the type declaration to 8, 16 or 32 bits will even further expand the possible variety of operations.

The address of the specific designated localized irrigation control unit of the third plurality of localized irrigation control units comprises an address transmission size in the range 0 to 128 bits, preferably 16 bits. The address transmission size determines the maximum number of possible communicative or addressable irrigation control units connected to the controller and power supply. Therefore, if additional irrigation control units are needed for either operation of sensors or control of irrigation valves, the address transmission size may be extended accordingly.

The data disclosing information regarding actions to be taken by the specific designated localized irrigation control unit of the third plurality of localized irrigation control units comprises a data transmission size in the range of 0 to 64 KBYTE. The data contained in a transmission may include information regarding timing of opening and closing of the controllable irrigation valves; however the data may include a wide variety of information.

The first check and the second check ensuring a safe reception of the transmission comprise a check transmission size in the range 0 to 128 bits, preferably 4 bits for each of the first and second checks. The first and second checks provide means for checking if transmitted information has been properly received.

The controller and power supply unit according to the first aspect of the present invention comprises a microprocessor, a storage unit for storing the schedules of instructions, an output section for providing power to the two-wire cable and transmitting the schedules of instruction on the two-wire cable, and an input section for monitoring the voltage of the two-wire cable. An interrupt window is initiated following a DC alternation of the first alternating DC voltage signal and the second alternating DC voltage signal and a power supply period. The power supply period is in the range 250 milliseconds to 550 milliseconds (preferably 400 milliseconds), and the interrupt window is in the range of 0 to 20 milliseconds, preferably less than 5 milliseconds. The microprocessor controls the output section to apply the minimum current to the two-wire cable during an interrupt window. The interrupt window allows the sensor decoders or line decoders to perform an interrupt during which the decoders may communicate information to the controller and power supply unit.

Each of the sensor decoders and/or line decoders comprises a short circuiting circuit providing an interrupt signal during the interrupt window to the controller and power supply unit by unidirectionally short circuiting the pair of control and power supply inputs, hence reducing the differential voltage of the two-wire cable and no interrupt signal by open circuiting the pair of control and power supply inputs. The interrupt signal is constituted by a voltage drop of the differential voltage of the two-wire cable in the range 5V to 35V (preferably 25V), thus the differential voltage is 10V. Hence the voltage of the two-wire cable during the interrupt signals is negative relative to ground voltage e.g. −10V, and therefore the alkaline process described earlier is maintained during interrupt signals. The microprocessor records the interrupt signal from at least one sensor decoder and/or line decoder of the third plurality of localized irrigation control units through the input section monitoring voltage of the two-wire cable, and subsequently operates the output section to perform a DC alternation of the first alternating DC voltage signal and the second alternating DC voltage signal and operates the output section to terminate the interrupt window and apply the maximum current to the two-wire:cable. Additionally, the microprocessor, following a recording of the interrupt signal from at least one interrupting sensor decoder and/or line decoder of the third plurality of localized irrigation control units, performs a DC alternation of the first alternating DC voltage signal and the second alternating DC voltage signal and transmits the type declaration Arbitration followed by a series of binary "1"s including an answer window for the at least one interrupting sensor decoder and/or line decoder of the third plurality of localized irrigation control units to answer as described below to the binary "1". The answer window is initiated following a DC alternation of the first alternating DC voltage signal and the second alternating DC voltage signal and a pause period, the pause period is in the range 2 milliseconds to 10 milliseconds, preferably 5 milliseconds. The answer window is in the range of 0 to 20 milliseconds, preferably less than 2.5 milliseconds. The series of binary "1"s constitute an opportunity for the interrupting decoder to answer yes or no during an answer window in accordance with the interrupting decoder's address. By selecting a series of binary "1"s for obtaining the address from the interrupting decoder, the shortest Arbitration transmission is achieved, since in the case of several interrupting decoders, the decoder with the lowest address will be addressed first, and decoders with higher addresses will be addressed subsequently at the next possible interrupt.

As in the case of the interrupt signal, the short circuiting circuit provides an answer signal during the answer window to the controller and power supply unit by unidirectionally short circuiting the pair of control and power supply inputs, hence reducing differential voltage of the two-wire cable and no answer signal by open circuiting the pair of control and power supply inputs. The answer signal is constituted by a voltage drop of the differential voltage on the two-wire cable in the range 5V to 35V (preferably 25V), or the differential voltage is 10V. Hence the voltage of the two-wire cable during the answer signals is negative relative to ground voltage, e.g. −10V, and therefore the alkaline process described above is maintained during the answer window. The microprocessor interprets the answer signal as an indication of a binary "0" and no answer signal as a binary "1".

The microprocessor according to the first aspect of the present invention further controls the output section to supply the minimum current to the two-wire cable during the answer window, so as to avoid unnecessary power loss caused by the answering decoder's transmission of binary "0"s. As soon as the answer from the answering decoder is detected by the controller and power supply unit, the controller and power supply unit applies the maximum current to the two-wire cable. Hence the power loss is significantly reduced as compared to techniques in state of the art control irrigation systems.

The second plurality of field sensors according to the first aspect of the present invention comprises a selection of temperature sensors, humidity sensors, pressure sensors, magnetic field sensors, mechanical movement sensors, mechanical strain sensors, flow sensors, fertilizer sensors or any combination thereof. The objective of these sensors is to provide specific parameters giving a complete picture of the conditions of the specific localized areas and may further be implemented in a wide variety of ways in order to obtain specific requested information regarding the conditions of the ground. A further objective of these sensors is to provide irrigation parameters giving a complete picture of the working conditions, functionality and operation of the controllable irrigation valves.

The controller and power supply unit according to the first aspect of the present invention during a declared type of transmission of schedules of instructions requests the specific irrigation parameters from an addressed sensor decoder of the third plurality of localized irrigation control units, and subsequently the controller and power supply unit transmits a series of binary "1" including the answer window for the addressed decoder to answer to the binary "1". The microprocessor records the answer signal from at least one sensor decoder of the third plurality of localized irrigation control units through the input section monitoring the voltage of the two-wire cable and operates the output section to perform a DC alternation of the first alternating DC voltage signal and the second alternating DC voltage signal and subsequently operates the output section to terminate the answer window and apply the maximum current to the two-wire cable. (The term "DC alternation" is to be conceived as a generic term for toggle, inversion or switching between the maximum and minimum voltages of the first and second alternating DC voltage signals.) By implementing the communication from the irrigation control units as described above, a series of advantages are achieved. The two-wire irrigation controlling and monitoring system consumes little power during normal operation and during transmission of information between the controller and power supply unit and the irrigation control units. By accomplishing the transmission of information using a pulse width defining a binary "1" and a pulse width defining a binary "0", the two-wire irrigation controlling and monitoring system provides an undisturbed power transmission at the same time as exchange of information.

The above objects, the above advantages and the above features together with numerous other objects, advantages and features, which will be evident from the below detailed description of a preferred embodiment of the present invention, is according to a second aspect of the present invention obtained by a method for controlling and monitoring in particular the irrigation of localized areas of soil, and comprising the following steps of:

providing water to said localized areas of soil through a water pipeline, controlling discharge or supply of water from said water pipeline, providing watering or non-watering of a specific area of said localized areas of soil through a first plurality of controllable irrigation valves each positioned at said specific area of said localized areas of soil and said first plurality of controllable irrigation valves having a pair of valve control inputs, measuring specific irrigation parameters through a second plurality of field sensors positioned at said specific areas of said localized areas of soil and said second plurality of field sensors having a pair of sensor outputs, transmitting control signals to said first plurality of controllable irrigation valves and said second plurality of field sensors though a third plurality of localized irrigation control units comprising a sensor decoder and a line decoder, providing valve control signals to said first plurality of controllable irrigation valves and/or recording said specific irrigation parameters from said second plurality of field sensors, each of said third plurality of localized irrigation control units having a pair of valve control outputs connected to the pair of valve control inputs of a specific controllable irrigation valve of said first plurality of controllable irrigation valves and/or a pair of sensor inputs connected to said pair of sensor outputs of a specific field sensor of the second plurality of field sensors and having a pair of control and power supply inputs, providing a set of schedules of instructions by means of a controller and power supply unit having a pair of control and power outputs supplying power by applying a first alternating DC voltage signal defining a voltage maximum having a first pulse width and defining a voltage minimum having a second pulse width to one of the pair of control and power outputs, simultaneously applying a second alternating DC voltage signal similarly shaped but of inverted polarity as compared to said first alternating DC voltage signal to another of said pair of control and power outputs and applying an alternating DC current defining a current maximum having a third pulse width and defining a current minimum having a fourth pulse width to said pair of control and power outputs, providing a two-wire cable, interconnecting said controller and power supply unit and said third plurality of localized irrigation control units through a two-wire cable connecting said pair of control and power outputs of said controller and power supply unit to said control and power inputs of said third plurality of localized irrigation control units and providing said power from said control and power unit to each of said third plurality of localized irrigation control units, and transmitting said schedules of instructions from said controller and power supply unit to said third plurality of localized irrigation control units through said two-wire cable and receiving said specific irrigation parameters from said third plurality of localized irrigation control units through said two-wire cable.

The method according to the second aspect of the present invention describes the operation of a two-wire controlling and monitoring system which includes any of the above discussed features and provides a method for achieving significant reductions in power consumption relative to today's state of the art.

The above objects, the above advantages and the above features, together with numerous other objects, advantages and features which will be evident from the below detailed description of a preferred embodiment of the present invention, is according to a third aspect of the present invention obtained by a localized irrigation control unit for a two-wire controlling and monitoring system including a controller and power supply unit and particularly for the irrigation of localized areas of soil and said localized irrigation control unit comprising:

a field sensor decoder for receiving input signals from a field sensor, converting said input signals to a binary number and transmitting said binary number to said controller and power supply unit, and a line decoder for receiving instructions from said controller and power supply unit or a mark sender unit, converting said instructions to a control signal and providing said control signal to a controllable irrigation valve.

The localized irrigation control unit according to the third aspect of the present invention provides means for irrigating the localized areas, means for measuring of specific irrigation parameters describing the conditions of the localized areas, means for communicating with the mark sender unit, and means performing communication with the controller and power supply unit. The localized irrigation control unit circuitry may be implemented for carrying out communication on a two-wire conducting cable, but may, however, be implemented for carrying out communication on optic cables or be implement for carrying out communication through radio transmitted signals. The input signals may comprise analogue voltage signals, analogue current signals, digital pulse count signals, digital pulse width modulation signals or digital pulse frequency modulation signals or any combinations thereof. The mark sender provides the possibility for manually controlling the operation of the controllable irrigation valves irrespective of the schedules of instructions transmitted by the controller and power supply unit. The mark sender ensures that an operator may initiate irrigation at localized areas by transmitting control signals to the controllable irrigation valve from the mobile mark sender.

The sensor decoder included in the localized irrigation control unit according the third aspect of the present invention comprises a field sensor power supply and field sensor signal amplifier having a pair of sensor inputs connected to a pair of sensor outputs of a specific field sensor, a control and power supply input section having pair of control and power supply inputs connected to a two-wire cable interconnecting the sensor decoder and the controller and power supply unit, a short circuiting circuit having switching means connected between the pair of control and power supply inputs, and a first microprocessor unit interconnecting the field sensor power supply and field sensor signal amplifier and the short circuiting circuit.

The line decoder included in the localized irrigation control unit according the third aspect of the present invention comprises a control and power supply input section having a pair of control and power supply inputs connected to the two-wire cable interconnecting the line decoder and the controller and power supply unit, a valve control power output stage having at least one pair of valve control outputs connected to a pair of valve control inputs of a specific controllable irrigation valve, and a second microprocessor unit interconnecting the control and power supply input section and the valve control output.

The above object, the above advantage and the above feature, together with numerous other objects, advantages and features which will be evident from the below detailed description of a preferred embodiment of the present invention, is according to a fourth aspect of the present invention obtained by a two-wire controlling and monitoring system particularly for the irrigation of localized areas of soil and comprising:

a water pipeline providing water to the localized areas of soil, a first plurality of controllable irrigation valves each positioned at a specific area of the localized areas of soil, communicating with the water pipeline, providing watering of the specific area controlled by the controlling and monitoring system and having a pair of valve control inputs, a third plurality of localized irrigation control units each comprising a line decoder having a pair of valve control outputs connected to the pair of valve control inputs of a specific controllable irrigation valve of the first plurality of controllable irrigation valves for providing valve control signals to the first plurality of controllable irrigation valves, the line decoders further each having a pair of control and power supply inputs, a controller and power supply unit having a set of schedules of instructions and having a pair of control and power outputs supplying power by applying a first alternating DC voltage signal defining a voltage maximum having a first pulse width and defining a voltage minimum having a second pulse width to one of the pair of control and power outputs, simultaneously applying a second alternating DC voltage signal similarly shaped but of inverted polarity as compared to the first alternating DC voltage signal to another of the pair of control and power outputs and applying an alternating DC current defining a current maximum having a third pulse width and defining a current minimum having a fourth pulse width to the pair of control and power outputs, a two-wire cable interconnecting the controller and power supply unit and the third plurality of localized irrigation control units and connecting the pair of control and power outputs of the controller and power supply unit to the control and power inputs of the third plurality of localized irrigation control units and providing the power from the controller and power supply unit to each of the third plurality of localized irrigation control units, the controller and power supply unit transmitting the schedules of instructions to the third plurality of localized irrigation control units through the two-wire cable and receiving the specific irrigation parameters from the third plurality of localized irrigation control units through the two-wire cable, and a specific line decoder being the intentional receiver of a specific schedule of instructions responding by transmitting an acknowledgement signal to the controller and power supply unit through the two-wire cable within a first time frame of the first pulse if the specific schedule of instructions is correctly received or, alternatively, transmitting a not-acknowledgement signal to the controller and power supply unit through the two-wire cable within a second time frame of the first pulse if the specific schedule of instructions is not correctly received.

The above object, the above advantage and the above feature, together with numerous other objects, advantages and features which will be evident from the below detailed description of a preferred embodiment of the present invention, is according to a fifth aspect of the present invention obtained by a two-wire controlling and monitoring system for in particular irrigation of localized areas of soil and comprising:

a water pipeline providing water to the localized areas of soil, a first plurality of controllable irrigation valves each positioned at a specific area of the localized areas of soil, communicating with the water pipeline, providing watering of the specific area of the localized areas controlled by the controlling and monitoring system of soil and having a pair of valve control inputs, a second plurality of field sensors positioned at specific areas of the localized areas of soil, providing specific irrigation parameters and having a pair of sensor outputs, a third plurality of localized irrigation control units, each comprising a sensor decoder having a pair of sensor inputs connected to the pair of sensor outputs of a specific field sensor of the second plurality of field sensors for providing power to the second plurality of field sensors and recording the specific irrigation parameters from the second plurality of field sensors, the sensor decoders further each having a pair of control and power supply inputs, a controller and power supply unit having a set of schedules of instructions and having a pair of control and power outputs supplying power by applying a first alternating DC voltage signal defining a voltage maximum having a first pulse width and defining a voltage minimum having a second pulse width to one of the pair of control and power outputs, simultaneously applying a second alternating DC voltage signal similarly shaped but of inverted polarity as compared to the first alternating DC voltage signal to another of the pair of control and power outputs and applying an alternating DC current defining a current maximum having a third pulse width and defining a current minimum having a fourth pulse width to the pair of control and power outputs, a two-wire cable interconnecting the controller and power supply unit and the third plurality of localized irrigation control units and connecting the pair of control and power outputs of the controller and power supply unit to the control and power inputs of the third plurality of localized irrigation control units, and providing the power from the controller and power supply unit to each of the third plurality of localized irrigation control units, the controller and power supply unit transmitting the schedules of instructions to the third plurality of localized irrigation control units through the two-wire cable and receiving the specific irrigation parameters from the third plurality of localized irrigation control units through the two-wire cable, and a specific sensor decoder being the intentional receiver of a specific schedule of instructions responding by transmitting an acknowledgement signal to the controller and power supply unit through the two-wire cable within a first time frame of the first pulse if the specific schedule of instructions is correctly received or, alternatively, transmitting a not-acknowledgement signal to the controller and power supply unit through the two-wire cable within a second time frame of the first pulse if the specific schedule of instructions is not correctly received.

The two-wire controlling and monitoring systems according to the fourth and fifth aspects of the present invention are particularly advantageous in that the intentional receiver of a specific schedule of instructions responds positively by transmitting an acknowledgement signal if the specific schedule of instructions is correctly received, or, alternatively, transmits a not-acknowledgement signal if the specific schedule of instruction is not correctly received. By the positive acknowledgement or not-acknowledgement, the controller and power supply unit receives positive verification of receipt or not-receipt from the intentional receiver by receiving the acknowledgement or not-acknowledgement signal, respectively, and also by the lack of any acknowledgement or not-acknowledgement signal determines that no intentional receiver of the specific schedule of instructions has received the schedule of instructions and, therefore, a retransmission is carried out; likewise by the receipt of the not-acknowledgement signal, a retransmission is carried out.

The transmission of the acknowledgement or, alternatively, the not-acknowledgement signal from the intentional receiver of the specific schedule of instructions within the first or the second time frames, respectively, is advantageously controlled by the controller and power supply unit supplying a minimum current to the two-wire cable during the first and the second time frames of the first pulse, allowing the transmission of the acknowledgement or, in the alternative, the not-acknowledgement signal from the intentional receiver of the specific schedule of instructions to the controller and power supply unit to be carried out in accordance with the short-circuit signalling technique mentioned above, and also to be described in greater details below with reference to the presently preferred embodiment of the system according to the present invention.

The first frame may according to a first embodiment of the two-wire controlling and monitoring system according to the fourth and fifth aspects of the present invention be located prior to the second frame; however, according to the presently preferred embodiment of the two-wire controlling and monitoring system according to the fourth and fifth aspects of the present invention, the second frame is located prior to the first frame, thereby allowing the controller and power supply unit to readily retransmit the schedule of instructions after receipt of the not-acknowledgement signal.

The two-wire controlling and monitoring system according to the fourth and fifth aspects of the present invention preferably further exhibits the features of the two-wire controlling and monitoring system according to the first aspect of the present invention as discussed above.

The above object, the above advantage and the above feature together with numerous other objects, advantages and features which will be evident from the below detailed description of a preferred embodiment of the present invention is according to a sixth aspect of the present invention obtained by a method for controlling and monitoring in particular irrigation of localized areas of soil and comprising the following steps of:

providing water to the localized areas of soil through a water pipeline, controlling the discharge or supply of water from the water pipeline, providing watering of the specific area of a localized areas of soil through a first plurality of controllable irrigation valves each positioned at a specific area of the localized areas of soil and the first plurality of controllable irrigation valves having a pair of valve control inputs, measuring specific irrigation parameters through a second plurality of field sensors positioned at specific areas of the localized areas of soil and the second plurality of field sensors having a pair of sensor outputs, transmitting control signals to the first plurality of controllable irrigation valves and the second plurality of field sensors though a third plurality of localized irrigation control units comprising a sensor decoder and a line decoder, providing valve control signals to the first plurality of controllable irrigation valves and/or recording the specific irrigation parameters from the second plurality of field sensors, each of the third plurality of localized irrigation control units having a pair of valve control outputs connected to the pair of valve control inputs of a specific controllable irrigation valve of the first plurality of controllable irrigation valves and/or a pair of sensor inputs connected to the pair of sensor outputs of a specific field sensor of the second plurality of field sensors and having a pair of control and power supply inputs, providing a set of schedules of instructions by means of a controller and power supply unit having a pair of control and power outputs supplying power by applying a first alternating DC voltage signal defining a voltage maximum having a first pulse width and defining a voltage minimum having a second pulse width to one of the pair of control and power outputs, simultaneously applying a second alternating DC voltage signal similarly shaped but of inverted polarity as compared to the first alternating DC voltage signal to another of the pair of control and power outputs and applying an alternating DC current defining a current maximum having a third pulse width and defining a current minimum having a fourth pulse width to the pair of control and power outputs, providing a two-wire cable, interconnecting the controller and power supply unit and the third plurality of localized irrigation control units through a two-wire cable connecting the pair of control and power outputs of the controller and power supply unit to the control and power inputs of the third plurality of localised irrigation control units and providing the power from the control and power unit to each of the third plurality of localized irrigation control units, transmitting the schedules of instructions from the controller and power supply unit to the third plurality of localized irrigation control units through the two-wire cable and receiving the specific irrigation parameters from the third plurality of localized irrigation control units through the two-wire cable, and transmitting from an irrigation control unit being the intentional receiver of a specific schedule of instructions an acknowledgement signal to the controller and power supply unit through the two-wire cable within a first time frame of the first pulse, provided the specific schedule of instructions is correctly received or alternatively a not-acknowledgement signal to the controller and power supply unit through the two-wire cable within a second time frame of the first pulse provided the specific schedule of instructions is not correctly received.

BRIEF DESCRIPTION OF THE DRAWINGS

FIGS. 17a-17c show alternating DC voltage signals versus time, illustrating a first and presently preferred technique of transmission of acknowledgement or not-acknowledgement signals from an intentional receiving decoder to the controller and power supply unit alter transmission of a schedule of instructions from the controller and power supply unit to the intentional receiving decoder.

FIGS. 18*a*-18*c* show alternating DC voltage signals venus time, illustrating a second and alternative technique of transmission of acknowledgement or not-acknowledgement signals from an intentional receiving decoder to the controller and power supply unit after transmission of a schedule of instructions from the controller and power supply unit to the intentional receiving decoder.

DETAILED DESCRIPTION OF THE INVENTION

Figure 1:
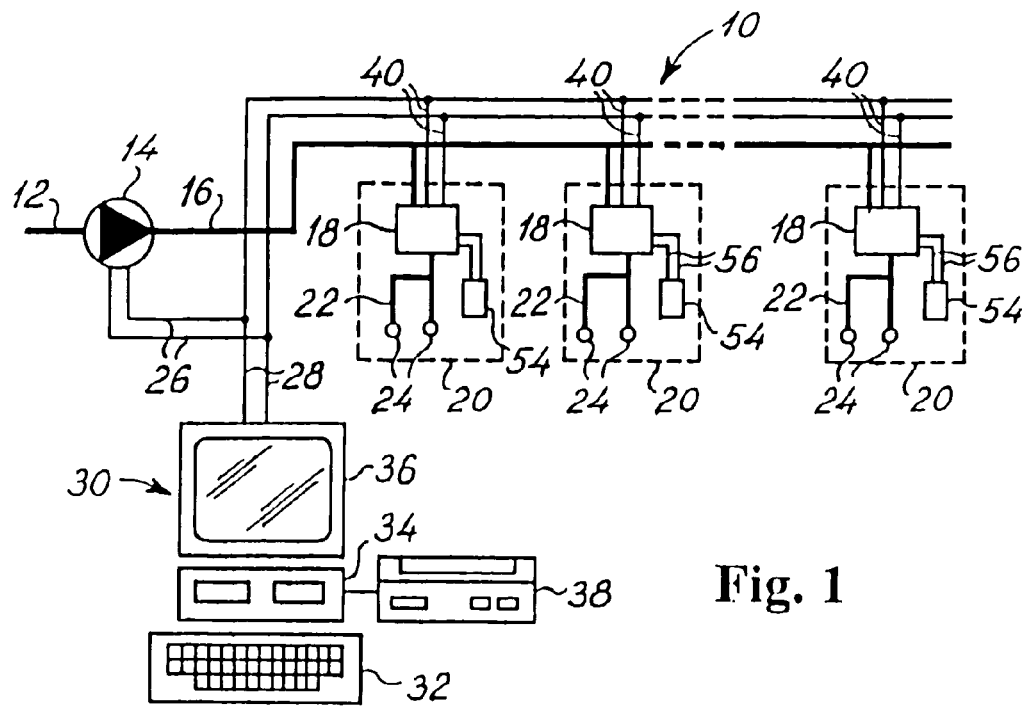
FIG. 1 shows a schematic overview of the two-wire controlling and monitoring system according to the preferred embodiment of the present invention.

The two-wire controlling and monitoring system designated by numeral 10 in its entirety and shown in FIG. 1, provides irrigation of localized areas, e.g., a golf course having certain areas needing a particular amount of irrigation and others a smaller amount of irrigation, parks having tree sections, lawns or flower beds all needing particular amounts of irrigation, greenhouse production lines having a series of production steps for plants, flowers or vegetables all needing a particular amount of irrigation or farming fields having a variety of produce needing a variety of amounts of irrigation.

The two-wire controlling and monitoring system 10 has an inlet connection 12 supplying water from a general household water pump station or a water tank to a pump 14. The pump 14 is mechanically, pneumatically, hydraulically, electrically or magnetically driven or driven by combinations thereof and provides a water pressure on a water pipeline 16 enabling the water pipeline 16 to supply water to a plurality of localized irrigation control units 18 positioned at a series of localized areas of soil 20.

The water pipeline 16 may be constructed from metal pipes produced of materials such as iron, steel, copper, aluminium, silver, gold or any alloys thereof, and/or plastic pipes produced of materials such as PVC, PP or PE or any combinations thereof.

The localized irrigation control units 18 are positioned at the series of localized areas of soil 20 and provide irrigation to specific areas of each of the localized areas of soil 20 through a plurality of local pipelines 22, possibly mounted with sprinkling gadgets 24. The localized irrigation control units 18 utilize connections 40, and the pump 14 utilizes connections 26 to communicate through a two-wire cable 28 interconnecting a controller and power supply unit 30 with the plurality of localized irrigation control units 18 and the pump 14. The controller and power supply unit 30 transmits power and schedules of instructions to the plurality of localized irrigation control units 18.

The controller and power supply unit 30 comprises a keyboard 32 for a user to communicate schedules of instructions, i.e. controlling timing of irrigation and position of irrigation to be stored and executed by a computer 34. The controller and power supply unit 30 further comprises a monitor 36 for displaying the operation of the two-wire controlling and monitoring system 10 and a printer 38 for printing out information from the computer 34. The computer 34 may include an internal or external modem through which remote monitoring and controlling of the computer 34 is achieved and thereby remote monitoring and controlling of the controller and power supply unit 30. The computer 34 may further have access to internet facilities which similarly provides the possibility for remotely monitoring and controlling of the computer 34 and thereby the controller and power supply unit 30. Additionally, a series of computers, for example, operating irrigation monitoring and controlling systems like the computer 34 may be monitored and controlled from a central unit located at any position world-wide hooked up to the Internet or connecting to the series of computers through use of modems.

Figure 2:
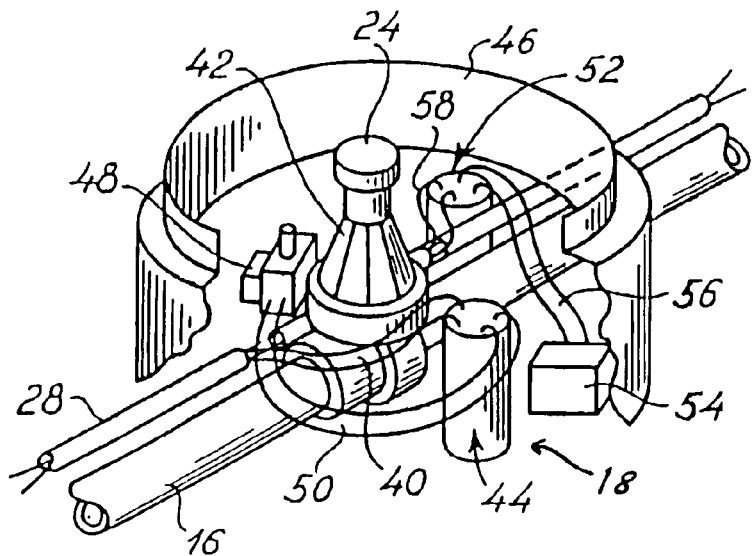
FIG. 2 shows, in perspective, a localized irrigation control unit according to the preferred embodiment of the present invention, an interconnecting a two-wire cable and a controllable irrigation valve in communication with a water pipeline, and the localized irrigation control unit further being connected to a field sensor.

The localized irrigation control units 18 are situated in a housing or cabinet 46, shown in FIG. 2, made of a wear resistant material such as metals like aluminum or steel or plastics like PVC, PP or PE. The housing 46 protects the localized irrigation control units 18 from any hostile environment in which the housing is located.

Each of the localized irrigation control units 18, as shown in FIG. 2, may comprise a controllable irrigation valve 42 controlling release of water from the water pipeline 16 and a line decoder 44 transmitting the necessary schedules of instructions to the controllable irrigation valve 42.

The controllable irrigation valve 42 may be magnetically, electrically, hydraulically or pneumatically operated or combinations thereof; however, according to the presently preferred embodiment of the invention the controllable irrigation valve 42 is electrically operated through connectors placed in a connector box 48 in the housing 46. The connector box 48 comprises a solenoid, which controls the valve in an open or closed position. Variations in the current applied to the solenoid cause the induction of magnetic fields, which subsequently activate the valve.

Figure 5:
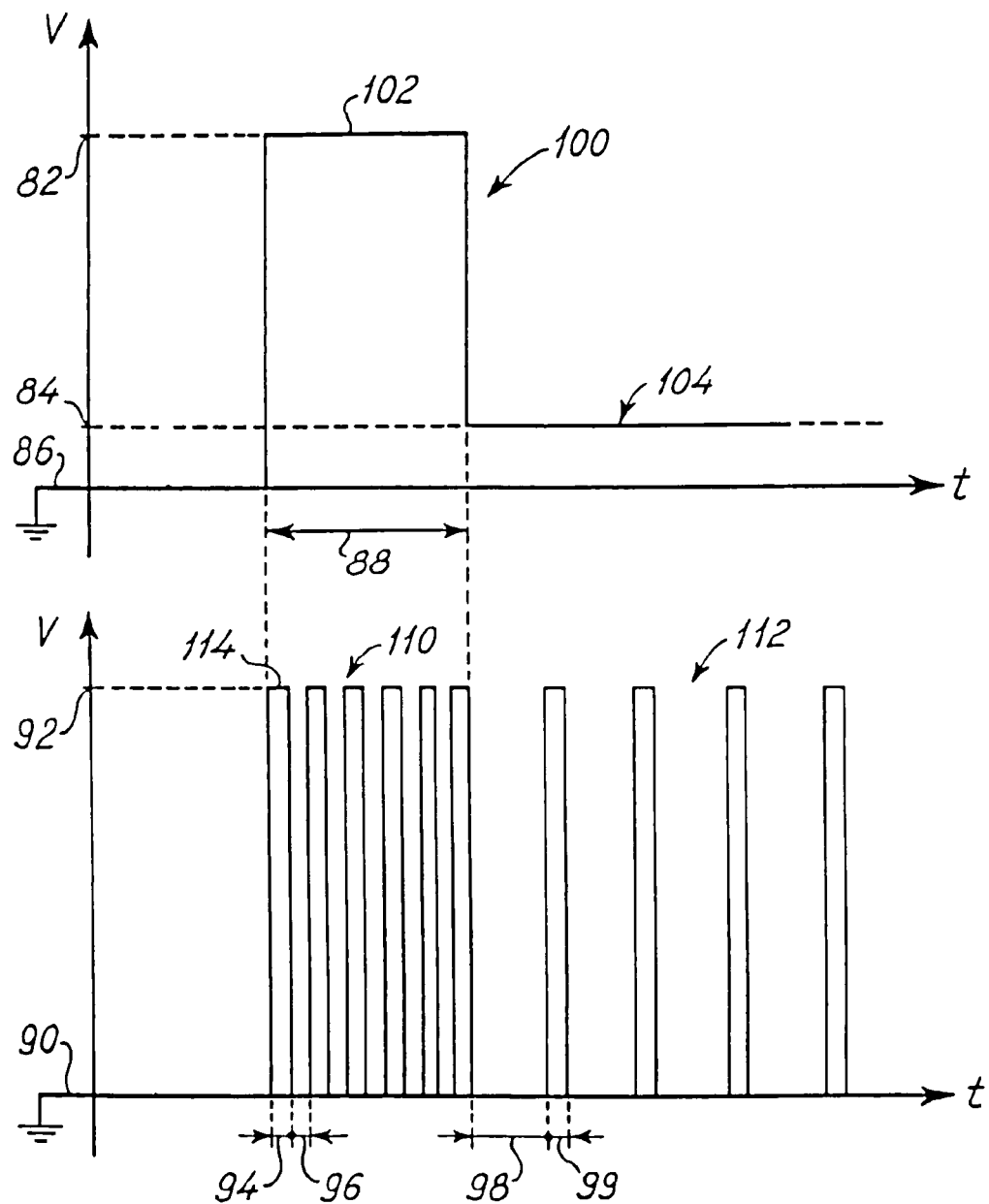
FIG. 5 shows a control voltage signal versus time provided by a line decoder in one of the localized irrigation control units to one of the controllable irrigation valves.

The line decoder 44 receives transmissions of schedules of instructions from the controller and power supply unit 30 through the two-wire cable 28. A pair of control and power inputs 40 connects the line decoder 44 to the two-wire cable 28. A pair of valve control outputs 50 connects the connector box 48 to the line decoder 44. The line decoder 44 applies control signals 100 to the connector box 48 through the pair of valve control outputs 50, which control signals 100, described in further detail below with reference to FIG. 5, are further communicated by the connector box 48 to the controllable irrigation valve 42. Alternatively, the line decoder 44 may receive start instructions through radio transmissions produced by a mobile handheld mark sender providing the opportunity to initiate irrigation at specific localized areas regardless of schedules of instructions. This enables manual control of the controllable irrigation valves 42.

The localized irrigation control unit 18 further comprises a sensor decoder 52, as shown in FIGS. 1 and 2, recording a specific irrigation parameter from a field sensor 54 through a pair of sensor outputs 56 and providing a conversion of the specific irrigation parameter measured by the field sensor 54 to a binary number and additionally performing a transmission of the binary number to the controller and power supply unit 30. The sensor decoder 52 is connected to the two-wire cable 28 through a pair of control and power inputs 58. The specific irrigation parameters may be soil or air temperature, soil or air humidity, water pressure in the water pipeline 16, water flow in the water pipeline 16 or water flow through one of the controllable irrigation valves 42. Furthermore, the specific irrigation parameters may be mechanical movement, mechanical strain or magnetic fields which may be utilized for the determination of the functionality or operation of the controllable irrigation valves 42.

Figure 3:
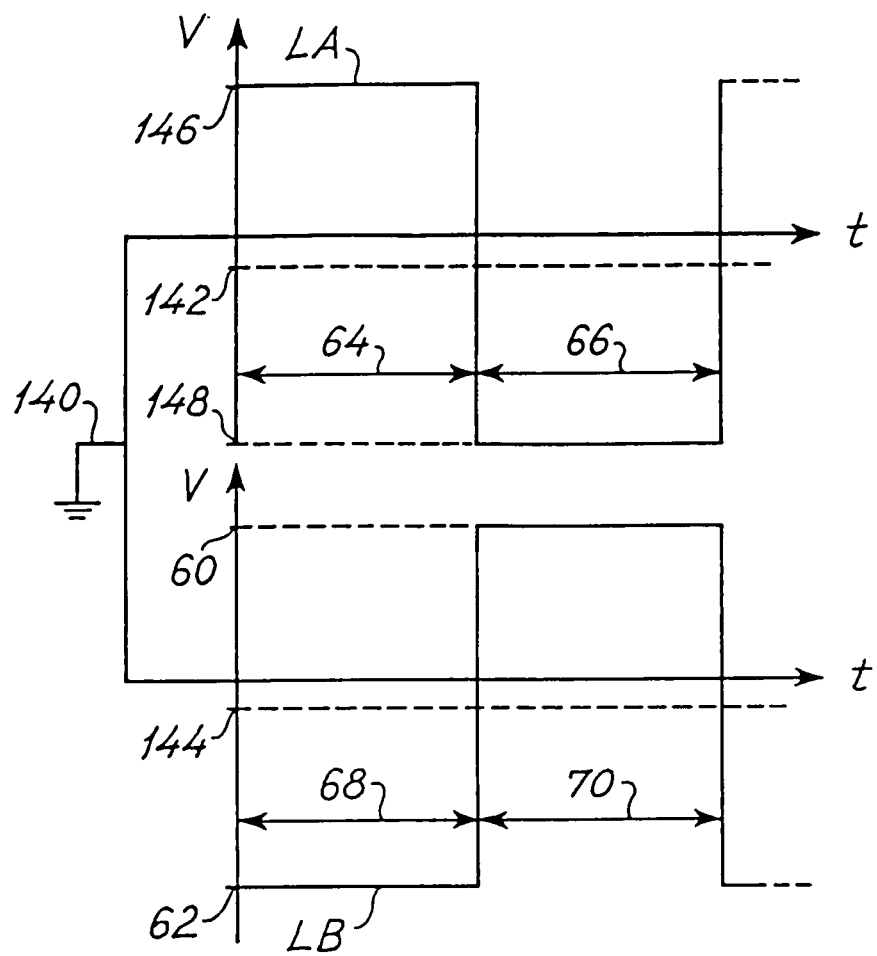
FIG. 3 shows alternating DC voltage signals versus time provided from a controller and power supply unit on the two-wire cable to at least one of the localized irrigation control units.

The line decoder 44 and the sensor decoder 52 receive power through the two-wire cable 28 from the controller and power supply unit 30. FIG. 3 shows voltage versus time curves of a first alternating DC voltage signal, designated by LA, and a second alternating DC voltage signal, designated by LB, simultaneously provided by the controller and power supply unit 30 to the two-wire cable 28 for powering of the line decoder 44 and the sensor decoder 52.

The first alternating DC voltage signal LA has a positive pulse with a pulse width 64 in the range 450 milliseconds to 550 milliseconds and a negative pulse with a pulse width 66 in the range 450 milliseconds to 550 milliseconds. In the presently preferred embodiment of the invention, the pulse width 64 is substantially equal to 500 milliseconds, and the pulse width 64 and the pulse width 66 are substantially equal.

The first alternating DC voltage signal LA has a maximum voltage 146 in the range of +10V to +20V and has a minimum voltage 148 in the range of −15V to −25V. In the presently preferred embodiment of the invention the maximum voltage 146 is +15V and the minimum voltage 148 is equal to −20V.

The first alternating DC voltage signal LA is symmetrical about a line 142 indicating a negative offset voltage of the first alternating DC voltage signal LA. In the presently preferred embodiment of the invention, the offset voltage is approximately −2V.

The second alternating DC voltage signal LB is inverted in comparison with the first alternating DC voltage signal LA and has a negative pulse with a pulse width 68 in the range 450 milliseconds to 550 milliseconds and a positive pulse with a pulse width 70 in the range 450 milliseconds to 550 milliseconds. In the presently preferred embodiment of the present invention the pulse width 68 is substantially equal to 500 milliseconds and the pulse width 64, the pulse width 66, the pulse width 68 and the pulse width 70 are substantially equal.

The term "inverted" in this context means a phase shift between the first alternating DC voltage signal LA and the second alternating DC voltage signal LB of approximately 180°.

The second alternating DC voltage signal LB has a maximum voltage 60 in the range of +10V to +20V and has a minimum voltage 62 in the range of −15V to −25V. In the presently preferred embodiment of the invention, the maximum voltage 60 is equal to the maximum voltage 146 of the first alternating DC voltage signal LA, and the minimum voltage 62 is equal to the minimum voltage 148 of the first alternating DC voltage signal LA.

The second alternating DC voltage signal LB is symmetrical about a line 144, which line 144 indicates a negative offset voltage of the second alternating DC voltage signal LB. In the presently preferred embodiment of the invention, the offset voltage of the second alternating DC voltage signal is approximately equal to the offset voltage of the first alternating DC voltage signal.

By offsetting the first and the second alternating DC voltage signals LA, LB with a negative voltage relative to ground 140, a substantially slower corrosion of the two-wire cable 28 is achieved. In the case of negative offset, the current will run from the ground level 140 to copper material of the two-wire cable 28 resulting in an alkaline process, which is less hazardous to the copper material than an electron acceptor donating process relative to ground level 140, achieved in the case of positive offset, forcing the current to run from the copper material to the ground level 140.

Figure 4:
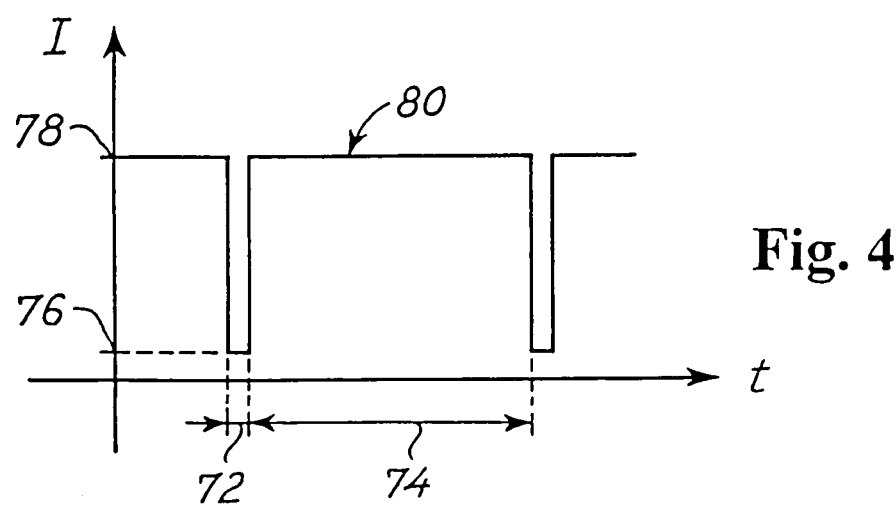
FIG. 4 shows alternating DC current signal versus time applied by the controller and power supply unit on to the two-wire cable and received by at least one of the localized irrigation control units.

FIG. 4 shows a current-versus-time curve of an alternating DC current signal 80 provided by the controller and power supply unit 30 between the wires of the two-wire cable 28. The alternating DC current signal 80 has a maximum current 78 in the range of 0.5 A to 2 A, and has a minimum current 76 in the range of 20 mA to 150 mA. In the presently preferred embodiment of the invention the maximum current 78 is 1.1 A and the minimum current 76 is 40 mA.

The alternating DC current signal 80 furthermore has a pulse width 72 defining the period of minimum current 76 of the alternating DC current signal 80, which pulse width 72 is in the range 0.1 millisecond to 10 milliseconds, and has a pulse width 74 defining the period of maximum current 78 of the alternating DC current signal 80. In the presently preferred embodiment of the invention, the pulse width 72 is shorter than 5 milliseconds and the pulse width 74 is less than 500 milliseconds. The length of the pulse width 74 depends on which operation is performed by the controller and power supply unit 30. In the case of an Arbitration or data transferring transmission consisting of a series of binary "1"s, the pulse width 74 is shorter than 20 milliseconds. During normal operation the pulse width 74, however, is shorter than 500 milliseconds.

FIG. 5 shows a voltage-versus-time curve of the control signal 100 provided by the line decoder 44 to the controllable irrigation valve 42. The control signal 100 consists of an inrush signal 102 and a hold signal 104. The inrush signal 102 provides a maximum voltage 82 for operating the controllable irrigation valve 42 in an open position, enabling water to flow from the water pipeline 16 to the local pipeline 22 positioned in the localized areas 20. The inrush signal 102 defines a pulse width 88 in the range 10 milliseconds to 1 second. In the presently preferred embodiment of the invention the pulse width 88 is in the range 30 milliseconds to 100 milliseconds. When the controllable irrigation valve 42 is completely opened, the line decoder 44 changes the control signal 100 from the inrush signal 102 to the hold signal 104. The hold signal 104 has a reduced maximum voltage 84. The line decoder 44 continues to transmit the hold signal 104 as long as dictated by the schedules of instructions. As soon as the control signal is turned off, providing ground voltage 86 to the controllable irrigation valve 42, the controllable irrigation valve 42 closes and thereby disables the flow of water from the water pipeline 16 to the local pipeline 22.

In order to reduce power consumption of the controllable irrigation valves 42, the control signal 100 in the presently preferred embodiment of the invention is construed from a series of square wave pulses 114 constituting a pulsed inrush signal 110 and constituting a pulsed hold signal 112. The square wave pulse 114 defines a voltage maximum 92 having a pulse width 94 and defines a voltage minimum 90 having a pulse width 96 in the pulsed inrush signal 110, and it defines the voltage maximum 92 having a pulse width 99 and defines the voltage minimum 90 having a pulse width 98 in the pulsed hold signal 112. According to a first embodiment of the present invention, the pulse width 94 and the pulse width 96 and the pulse width 99 are 1 millisecond, but may be any value in the range 100 microseconds to 0.1 second. The pulse width 98 is 10 milliseconds, but may be any value in the range 6 milliseconds to 30 milliseconds. The average voltage of the pulsed inrush signal 110 is equal to the maximum voltage 82 of the inrush signal 102, and the average voltage of the pulsed hold signal 112 is equal to the reduced maximum voltage 84 of the hold signal 104. According to a second and presently preferred embodiment of the invention, the sum of the pulse widths 94 and 96 and the sum of the pulse widths 98 and 99 are 1 millisecond, but may be any value in the range 100 microseconds to 0.1 second. During the pulsed inrush signal 110, the pulse width 94 is substantially larger than the pulse width 96, thereby constituting an average voltage of the pulsed inrush signal 110 equal to the maximum voltage 82 of the inrush signal 102. During the pulsed hold signal 112 the pulse width 98 is substantially greater than the pulse width 99, thereby constituting an average voltage of the pulsed hold signal 112 equal to the reduced maximum voltage 84 of the hold signal 104.

The maximum voltage 82 of the control signal 100 in the presently preferred embodiment of the invention is 35V, but may have any value in the range 5V to 45V. The minimum voltage 84 of the control signal 100 in the presently preferred embodiment of the invention is 0V equal to ground level 86, but may be in the range 0V to 5V.

Figure 6:
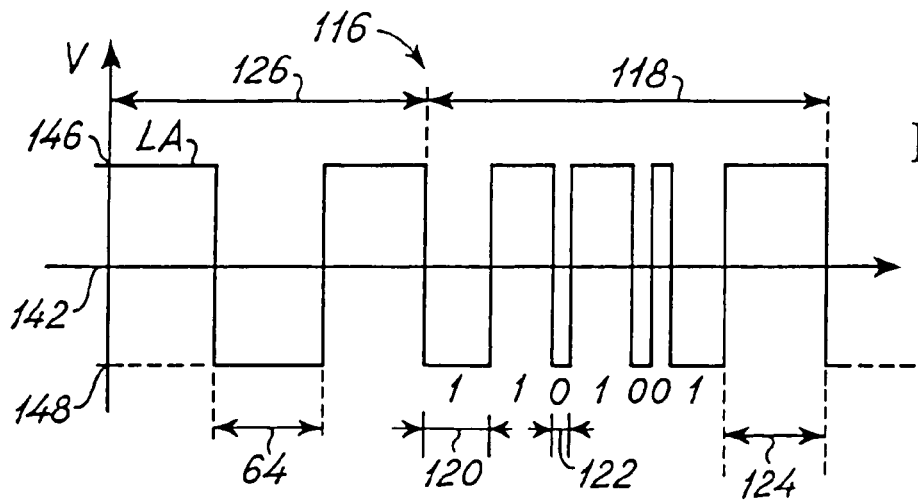
FIG. 6 shows a transmission of schedules of instructions provided by the controller and power supply unit to the localized irrigation control units.

The controller and power supply unit 30 transmits schedules of instructions simultaneously to transmitting power through the two-wire cable 28 to the line decoder 44. The schedules of instructions are transmitted to the irrigation control units 18 in a sequential binary pattern 118 construed from alternations or toggling of the first alternating DC voltage signal LA and the second alternating DC voltage signal LB. FIG. 6 shows a voltage-versus-time curve 116 having a normal pattern 126 where the first alternating DC voltage signal LA has the pulse width 64, the maximum voltage 146 and minimum voltage 148 and having the binary pattern 118. The sequential binary pattern 118 is provided by simultaneous alternations of the first alternating DC voltage signal LA and the second alternating DC voltage signal LB. FIG. 6 shows only the first alternating DC voltage signal for simplicity.

The binary pattern 118 defines a binary "1"s by having a pulse width 120 in the range 10 milliseconds to 49 milliseconds and defines a binary "0"s by having a pulse width 122 in the range 1 millisecond to 9 milliseconds. In the presently preferred embodiment of the invention, the pulse width 120 defining binary "1" is 20 milliseconds and the pulse width 122 defining binary "0" is approximately 5 milliseconds.

A transmission of the binary pattern 118 is concluded by a pulse width 124 defining a stop signal in the range of 50 milliseconds to 70 milliseconds. In the presently preferred embodiment of the invention the pulse width 124 is 60 milliseconds.

Figure 7:
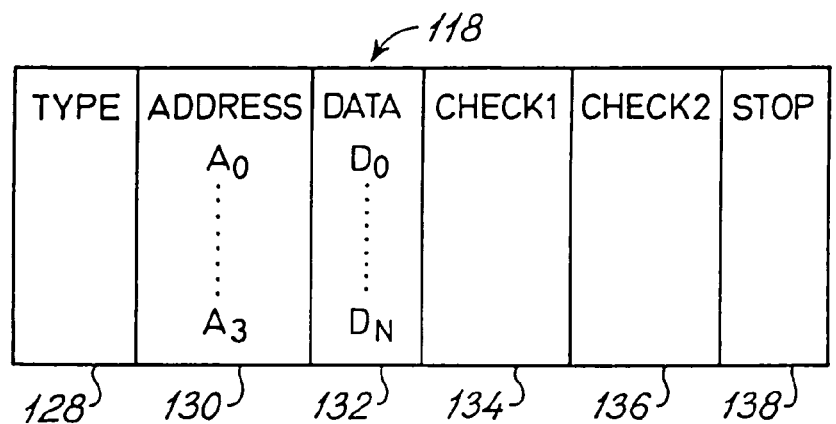
FIG. 7 shows an example of the contents of a transmission from the controller and power supply unit to the localized irrigation control units.

The transmission of schedules of instructions in the form of the binary pattern 118 from the controller and power supply unit 30 to the irrigation control unit 18, is shown as an example in FIG. 7, and according to the presently preferred embodiment of the invention, the transmission consists of type declaration 128 defining the type of operation needed by the irrigation control unit 18. In the presently preferred embodiment of the invention, type declarations may be "Arbitration" used for prioritizing functions, "Data" used for transmitting data to the irrigation control unit 18, "Control" used for switching line decoders 44 in the irrigation control units 18 on and off, "Broadcast" used for transmission of data to all irrigation control units 18 in the two-wire controlling and monitoring system 10, "Test" used for testing the functionality of one of the irrigation control units 18, and "Pole" used for extracting specific irrigation parameters from one of the sensor decoders 52 in the irrigation control units 18.

Depending on which type declaration 128 is transmitted, the binary pattern 118 may further consist of an address 130 having a transmission size in the range 0 128 bits, data 132 having a transmission size in the range of 0 to 1 Gbit, a first check 134 having a transmission size in the range of 0 to 128 bits, a second check 136 having a transmission size in the range of 0 to 128 bits, and finally the transmission is concluded by a stop signal 138 defined by the pulse width 124. In the presently preferred embodiment of the invention, the type declaration consists of 4 bits, the address 130 consists of 16 bits, the data 132 consists of up to 64 KBYTE (1 BYTE equals 1024 bits), the first check 134 consists of 4 bits and the second check 136 consists of 4 bits.

Figure 8:
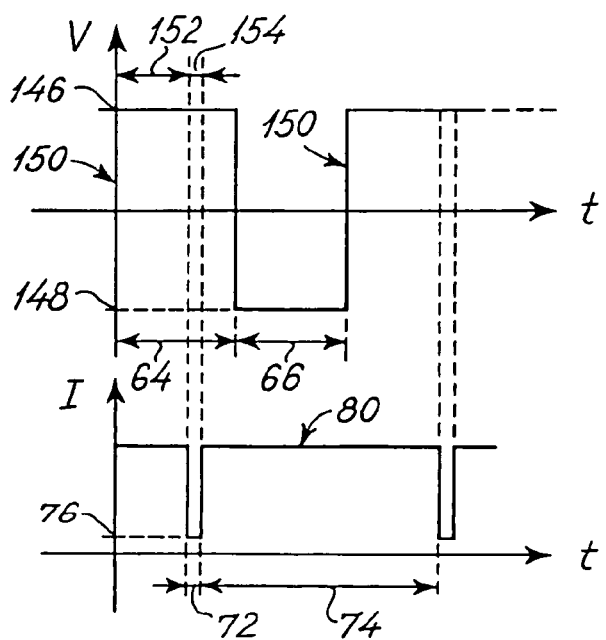
FIG. 8 shows an alternating DC voltage line signal transmitted on one conductor of the two-wire cable and corresponding alternating DC current signal between conductors of the two-wire cable.

FIG. 8 shows a voltage-versus-time curve of the first alternating DC voltage signal LA and simultaneously a curve of current-versus-time of the alternating DC current signal 80. During the positive pulse having the pulse width 64, the controller and power supply unit 30 provides an interrupt window 154 during which the alternating DC current signal applies the minimum current 76 to the two-wire cable 28 until an interrupt from the irrigation control units 18 is detected.

The pulse width 72 of the minimum current 76 part of the alternating DC current signal 80 determines the interrupt window's 154 active time period. In the presently preferred embodiment of the invention, the active time period of the interrupt window is shorter than 5 milliseconds. The precise length of the pulse width 72 is determined according to detection by the controller and power supply 30 of an interrupt from the irrigation control units 18. As soon as an interrupt is detected during the interrupt window 154, the DC alternating current signal shifts state and provides maximum current 78 to the two-wire cable.

Figure 9:
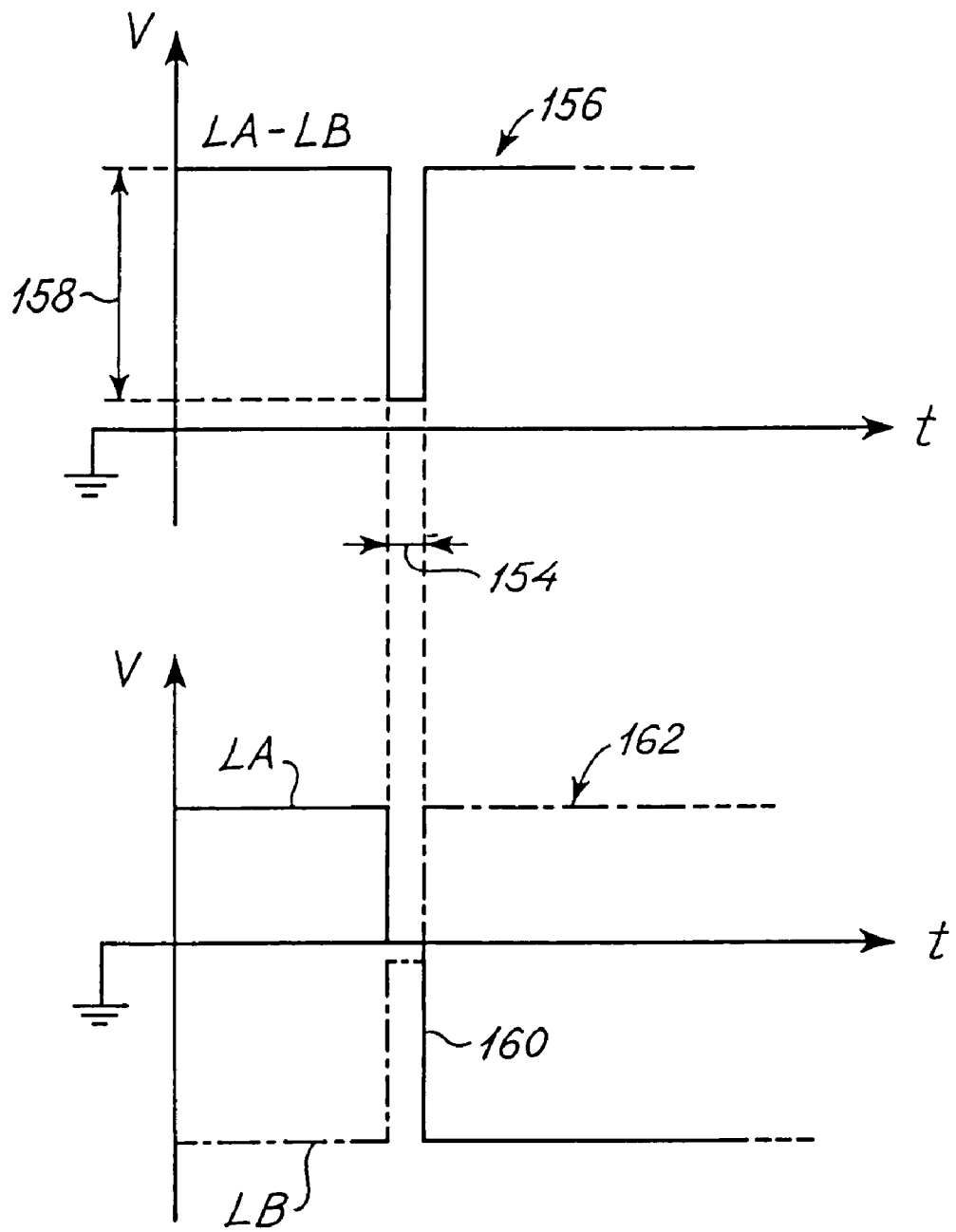
FIG. 9 shows a differential voltage signal between conductors of the two-wire cable and the corresponding two alternating DC voltage line signals.

The interrupt window 154 follows an alternation 150 of the first alternating DC voltage signal LA and a power active time period 152. In the presently preferred embodiment of the invention the power active time period 152 is 400 milliseconds. The sensor decoder 52 comprises a short circuiting circuit for unidirectionally short circuiting the pair of control and power inputs 58. The sensor decoder 52 may request an interrupt of the two-wire controlling and monitoring irrigation system 10 by unidirectionally short circuiting the pair of control and power inputs 58 during the interrupt window 154 and hence provide a voltage drop 158 of a differential voltage 156 between the first alternating DC voltage signal LA and the second alternating DC voltage signal LB, shown in FIG. 9. FIG. 9 shows a voltage-versus-time curve of the differential voltage 156 during transmission of the request of an interrupt. In the presently preferred embodiment of the invention, the maximum voltage of the differential voltage 156 is in the range 25V to 45V (preferably 35V), and during the request of an interrupt the differential voltage may drop to a value in the range 15V to 30V. However, in the presently preferred embodiment of the invention, the differential voltage may drop to a maximum of 25V or to a voltage of −10V relative to ground voltage.

FIG. 9 furthermore shows voltage-versus-time curves of the first alternating DC voltage signal LA and the second alternating DC voltage signal LB during the request for an interrupt. As FIG. 9 shows, during the request of an interrupt performed in the interrupt window 154, the voltage difference between the first alternating DC voltage signal LA and the second alternating DC voltage signal LB is significantly reduced, which reduction is detected by the controller and power supply unit 30. In response to the request of an interrupt, the controller and power supply unit 30 performs an alternation 160 of the first alternating DC voltage signal LA and the second alternating DC voltage signal LB, and it performs a shift in state of the DC alternating current signal 80 from minimum current 76 to maximum current 78. Since the short circuiting is unidirectional, the effect of the short circuit is avoided following the DC alternation of the first alternating DC voltage signal LA and the second alternating DC voltage signal LB. At the same time the DC alternation indicates to the plurality of irrigation control units 18 that the controller and power supply unit 30 has received an interrupt from one of the plurality of irrigation control units 18 and therefor the plurality of irrigation control units 18 are prepared for the initiation, by the controller and power supply unit 30, of a transmission 162 of the type declaration "Arbitration" on the two-wire cable 28.

Figure 10:
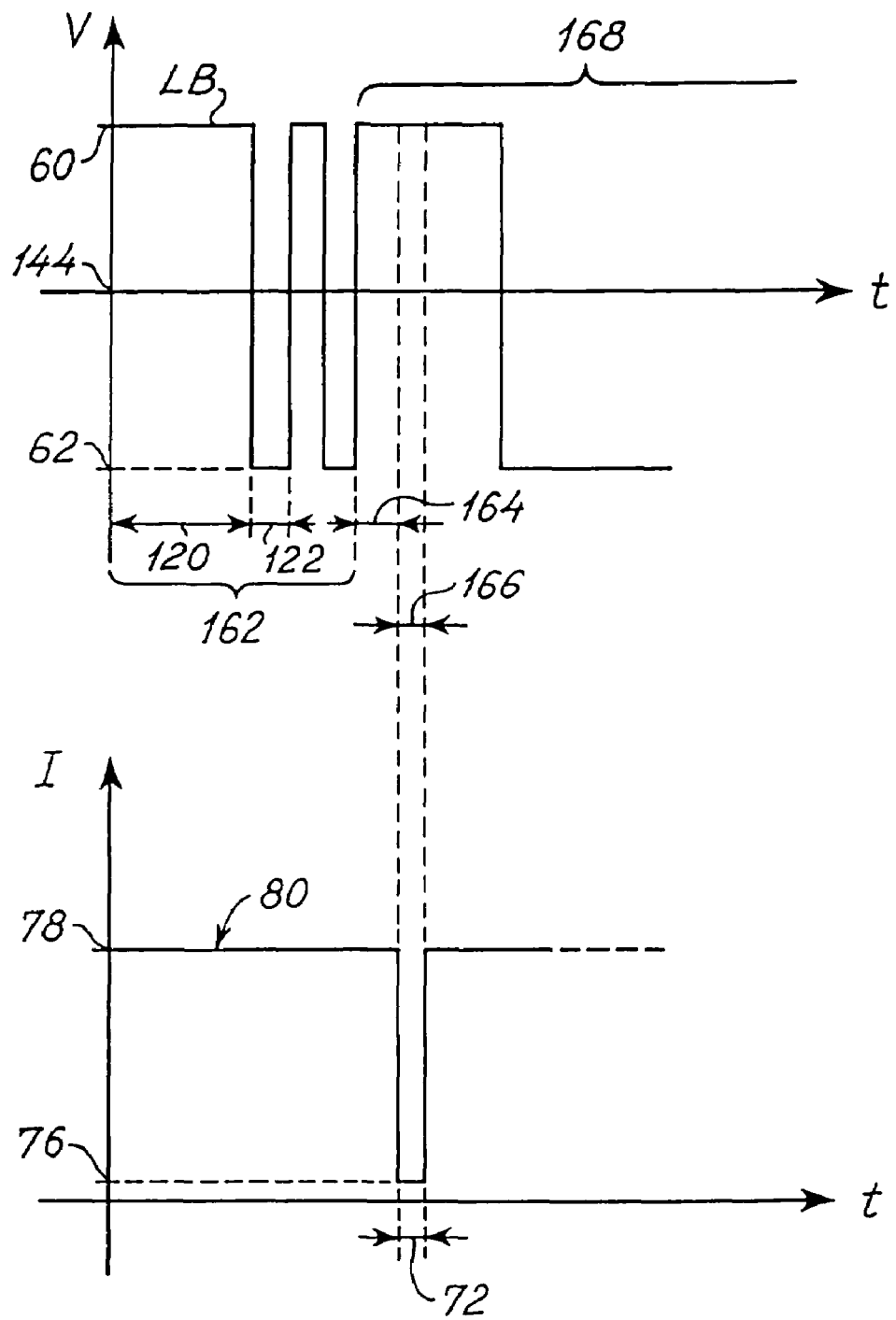
FIG. 10 shows a transmission of a type declaration followed by a sequence of binary "1"s including an answer window.

FIG. 10 shows a curve of the second alternating DC voltage signal LB transmitting the transmission 162 comprising a type declaration. If the type declaration transmitted is "Arbitration", then the controller and power supply unit 30 continues its transmission by applying a series of binary "1"s 168 to the two-wire cable 28 in order to obtain an address of the interrupting irrigation control unit 18 having the lowest address. Each of these binary "1"s includes an answer window 166 occurring after a delay 164, during which the minimum current 76 is applied to the two-wire cable 28. If at least one of the interrupting irrigation control units 18 during the first answer window 166 performs a unidirectional short circuiting of the pair of control and power inputs 58, then the controller and power supply unit 30 interprets the resulting voltage drop as a binary "0" indicating that the most significant bit of the address of the at least one of the interrupting irrigation control units 18 is "0". On the other hand, if none of the interrupting irrigation units 18 performs a short circuiting of the pair of control and power inputs 58 during the answer window 166, then the controller and power supply unit 30 interprets a binary "1" indicating that the most significant bit of the addresses of all of the interrupting irrigation control units 18 is "1". Subsequently the controller and power supply unit 30 initiates transmission of a second binary "1" including a second answer window 166 by performing a new alternation of the first alternating DC voltage signal LA and the second alternating DC voltage signal LB and applies the maximum current 78 to the two-wire cable 28. This process is repeated until the controller and power supply unit 30 has located the interrupting irrigation control unit 18 having the lowest address. In effect the interrupting irrigation control units 18 answer "yes" or "no" to the transmission of the series of binary "1"s 168 in accordance with the interrupting irrigation control units' 18 own address. When the controller and power supply unit 30 has identified for example the interrupting sensor decoder 52 by detecting the sensor decoder's 52 answers in the answer window 166, then the controller and power supply unit 30 continues a new transmission of binary "1"s including answering windows 166 for the interrupting sensor decoder 52 to transmit data from the sensor decoder 52 to the controller and power supply unit 30 by answering "yes" or "no".

Similar communication techniques as described above between the controller and power supply unit 30 and the individual irrigation control units 18 is utilized during the controller and power supply unit's 30 request for data from the irrigation control units 18 and during any type declaration in which obtaining information from the irrigation control units 18 is required.

Voltage drops outside a designated interrupt window 154 or answer window 166 or voltage drops below an acceptable voltage minimum during such a window (154, 166) may be due to equipment error. Thus, voltage drops further may show if the two-wire controlling and monitoring system has faulty equipment. Alternatively, the controller and power supply unit 30 may establish a separate test window in both high and low pulses of both the first alternating DC voltage signal LA and the second alternating DC voltage signal LB. The test window may be initiated following a toggle or alternation of the first and second alternating DC voltage signal LA and LB. According to one embodiment of the present invention the test window is initiated 100 milliseconds following a specific pre-selected alternation and has a length of 10 milliseconds. By reducing the alternating DC current signal 80 to minimum current 76 during the test window, erroneous signalling from the irrigation control unit 18 is avoided.

In the presently preferred embodiment of the invention, the alternating DC current signal 80 during the answer window 166 is reduced to the minimum current 76, which minimum current 76 lasts for the pulse width 72. The length of the pulse width 72 is determined in accordance with the earliest response from one of the answering irrigation control units 18 and limited to a having a maximum length of 2.5 ms. The answer window 166 during a transmission of a series of binary "1"s is initiated following a non-active time period of approximately 5 milliseconds.

Generally speaking, the communication between the controller and power supply unit 30 and the irrigation control units 18 is implemented by utilizing a unidirectional short circuiting circuit in the irrigation control units 18 for transmitting an interrupt request to the controller and power supply unit 30 and for transmitting answers to the controller and power supply unit 30. The reaction of the controller and power supply unit 30 is immediate alternation and consequently a shorter time having minimum current 76 applied to the two-wire cable 28. Even if the reaction of the controller and power supply unit 30 during the process of obtaining information from the irrigation control units 18 during the answer windows 166 is not restricted in the sense that a binary "0" must be 5 milliseconds but rather that a binary "0" is indicated entirely by a short circuiting signal from the irrigation control units 18 at any moment within the answer window. However, the faster the short circuiting signal is detected by the controller and power supply unit the better the power transfer to the irrigation control units 18 becomes.

The two-wire controlling and monitoring system 10 may be configured in a variety of ways. The presently preferred embodiment of the electronics of the two-wire controlling and monitoring system 10 is shown in FIGS. 11 to 16.

Figure 11:
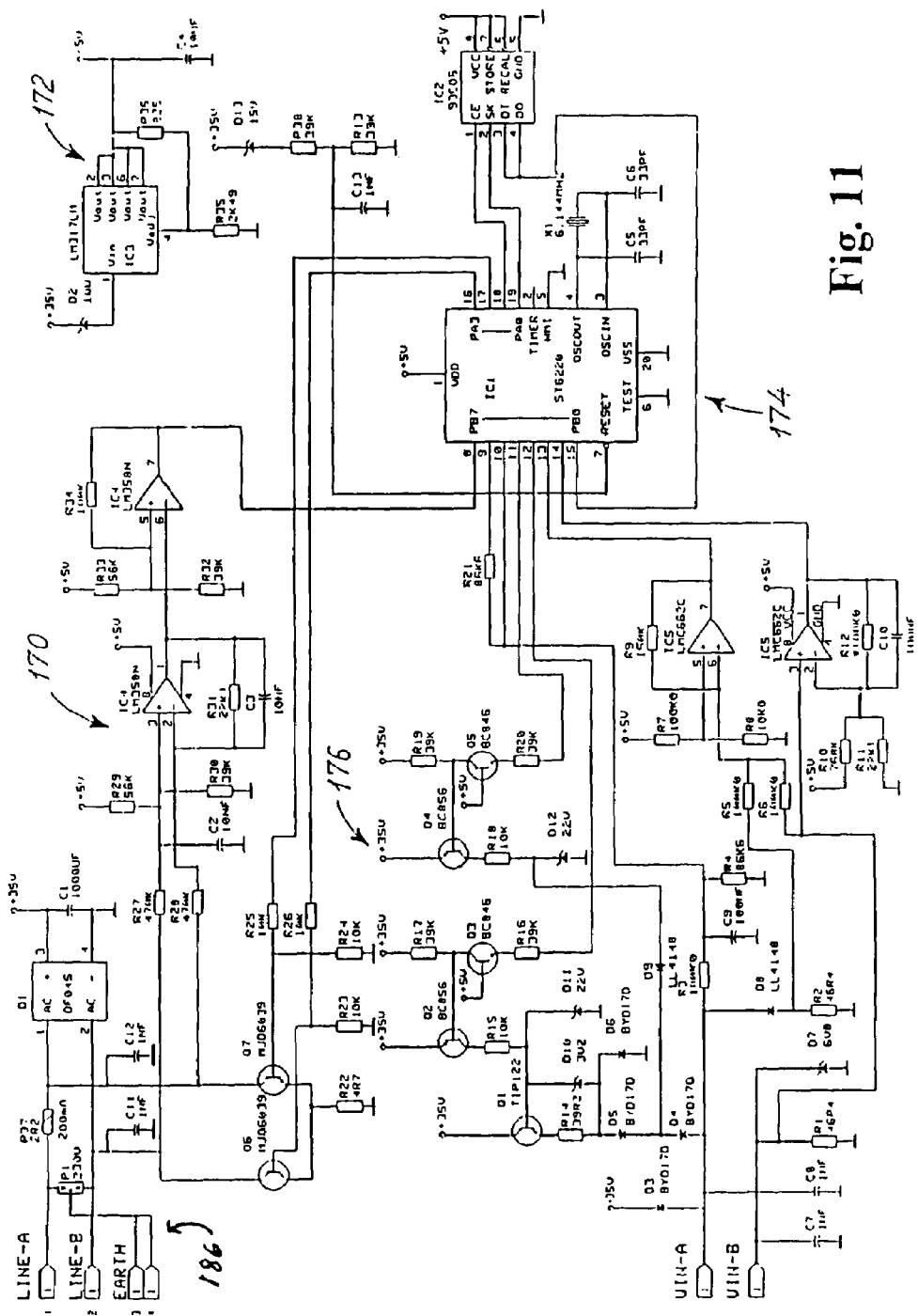
FIG. 11 shows a circuit diagram of the presently preferred embodiment of a sensor decoder.

FIG. 11 shows a circuit diagram of the presently preferred embodiment of the sensor decoder 52. The circuit diagram shows the short circuiting circuit 170, a control and power supply input section 186 having pair of control and power supply inputs designated by Line-A and Line-B, a constant voltage supply 172, a microprocessor 174 and a field sensor power supply and field sensor signal amplifier 176.

The short circuiting circuit 170 comprises a differential amplifier monitoring polarity of the lines Line-A and Line-B and communication information regarding polarity of the lines Line-A and Line-B to the microprocessor 174. The short circuiting circuit 170 further comprises two transistors for unidirectional short circuiting of the lines Line-A and Line-B. The transistors are controlled by the microprocessor 174 and operated to open or close during interrupt windows 154 and answering windows 166.

The control and power supply input section 186 provides an electrical separation between the two-wire cable 28 and the sensor decoder 52. This is achieved by employing bridge circuitry in combination with a reservoir capacitor. During interrupt windows 154 and answering windows 166 the current supplied to the two-wire cable 28 is significantly reduced and therefore, in order to keep the sensor decoder functioning during these short periods, the reservoir capacitor supplies the current needed for operating the sensor decoder 52.

Figure 12:
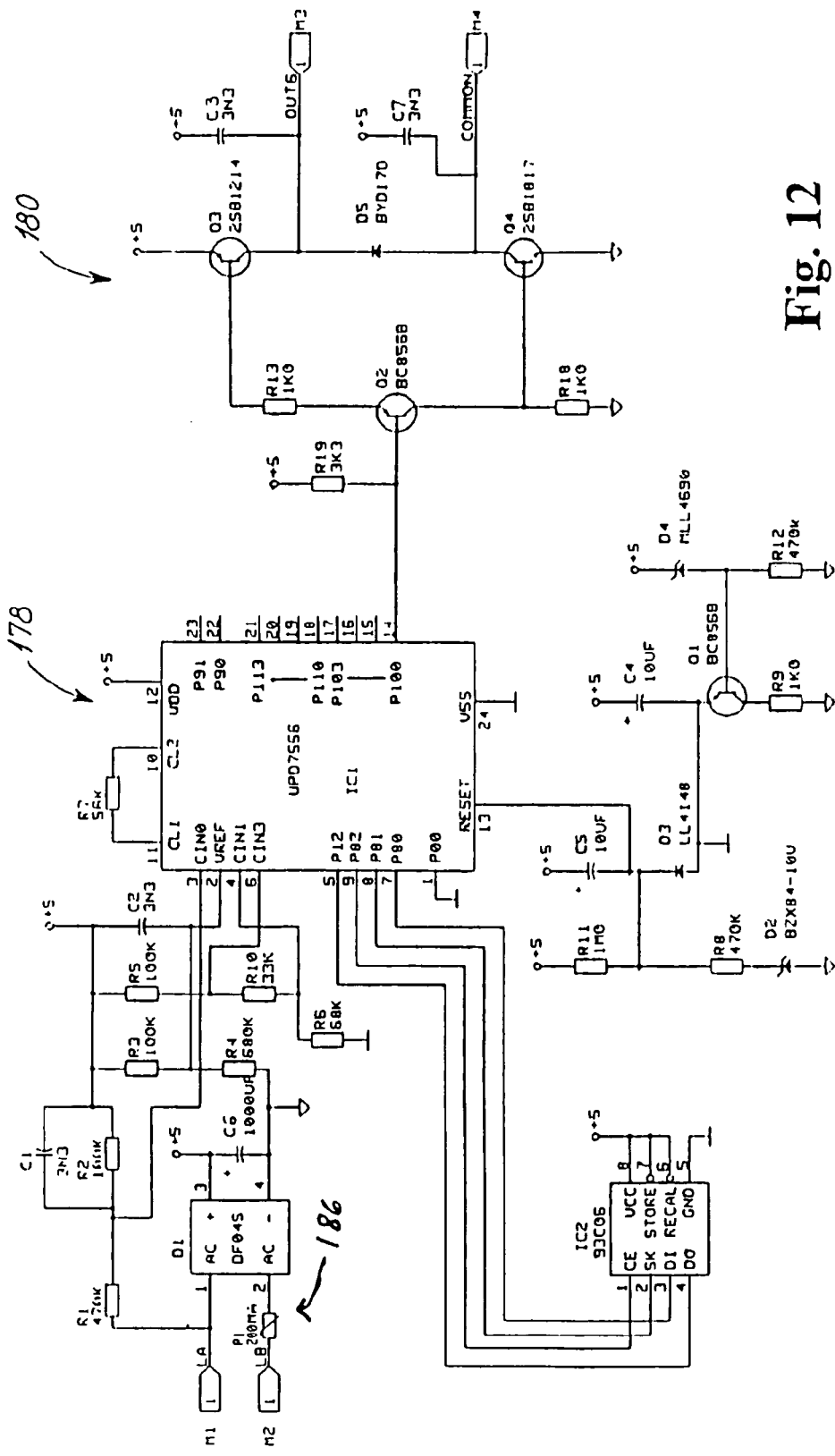
FIG. 12 shows a circuit diagram of the presently preferred embodiment of a line decoder having one valve control output.

FIG. 12 shows a circuit diagram of the presently preferred embodiment of the line decoder 44 having one valve control output. The circuit diagram shows a control and power supply input section 186 having pair of control and power supply inputs designated by LA and LB, a microprocessor 178 and an output power stage 180 for operating the controllable irrigation valves 42 to open and closed positions.

Figure 13:
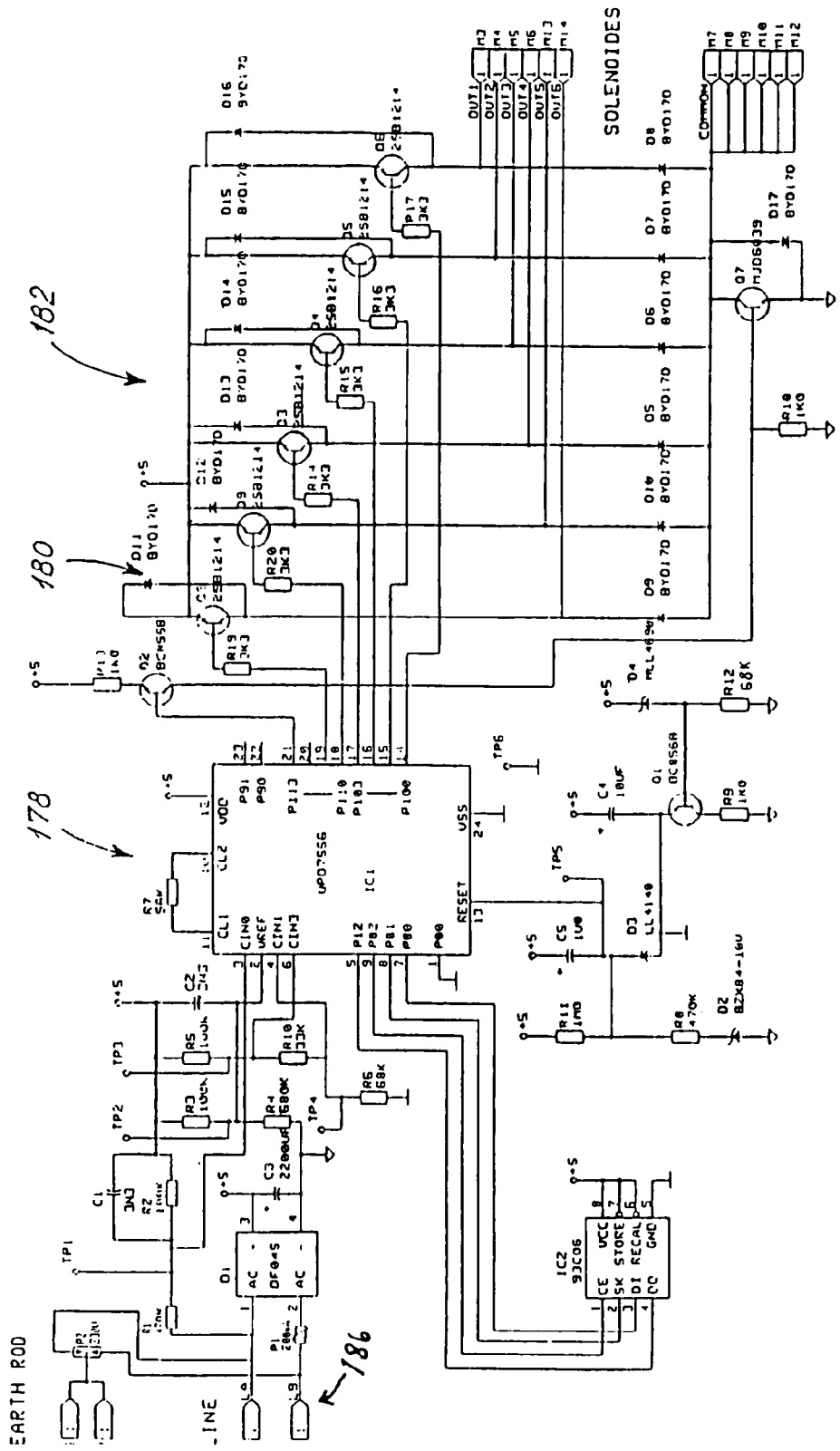
FIG. 13 shows a circuit diagram of the presently preferred embodiment of a line decoder having at least one valve control output.

FIG. 13 shows a circuit diagram of the presently preferred embodiment of the line decoder 44 having at least one valve control output. The circuit diagram shows the microprocessor 178 and a plurality 182 of the power output stage 180 for operating a series of the controllable irrigation valves 42 to open and closed positions.

Similar to the circuit diagram for the sensor decoder 52 depicted in FIG. 11, the line decoder 44 shown in FIG. 12 and the line decoder shown in FIG. 13 comprise power supply input sections 186 electrically separating the two-wire cable 28 from the internal circuitry of the line decoders 44 in FIGS. 12 and 13. The power supply input section 186 consists of a bridge circuit and a reservoir capacitor.

Figure 14A:
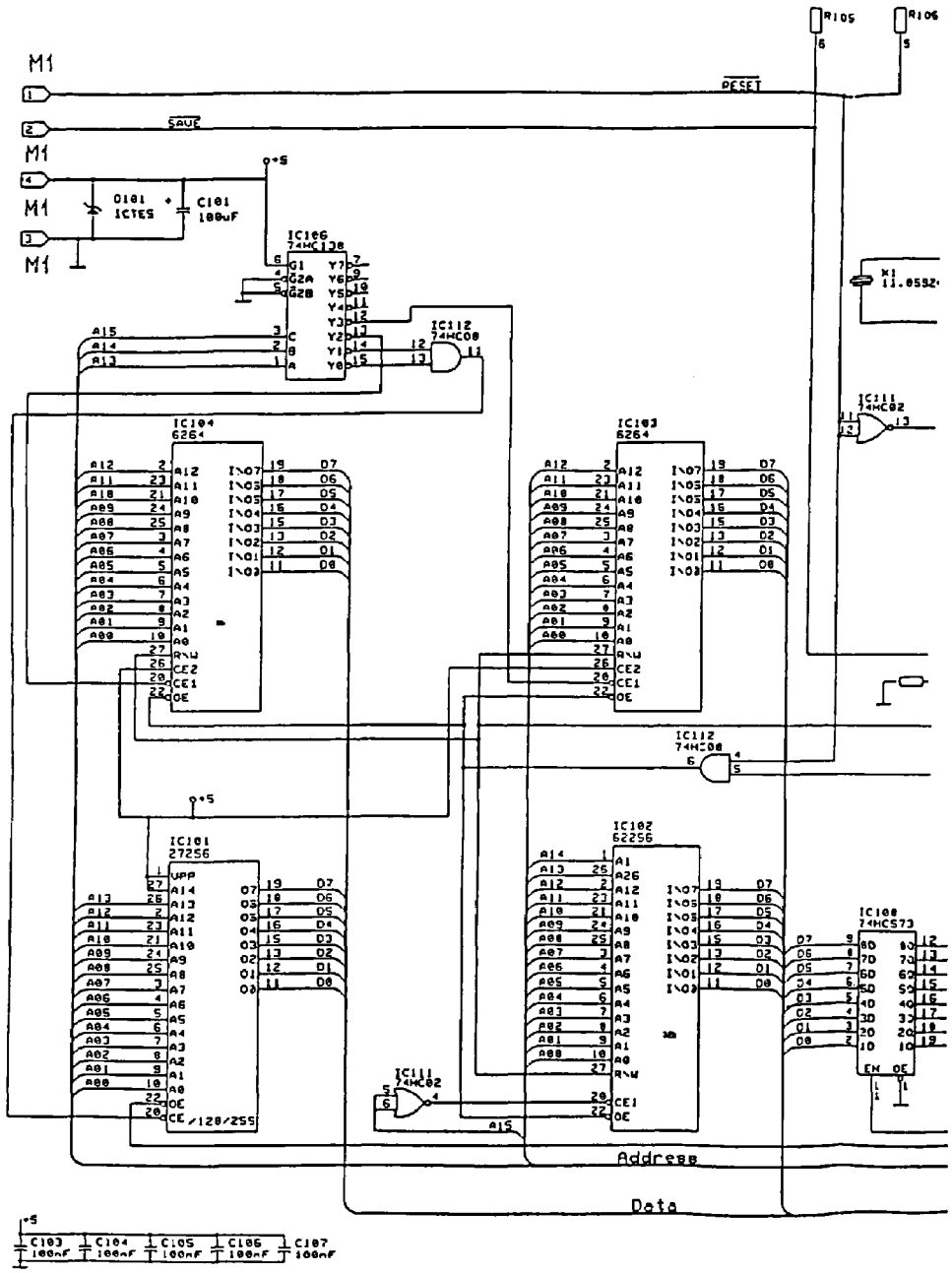
FIGS. 14a and 14b show a circuit diagram of a microprocessor and storage section included in a controller and power supply unit according to a preferred embodiment of the present invention.
Figure 14B:
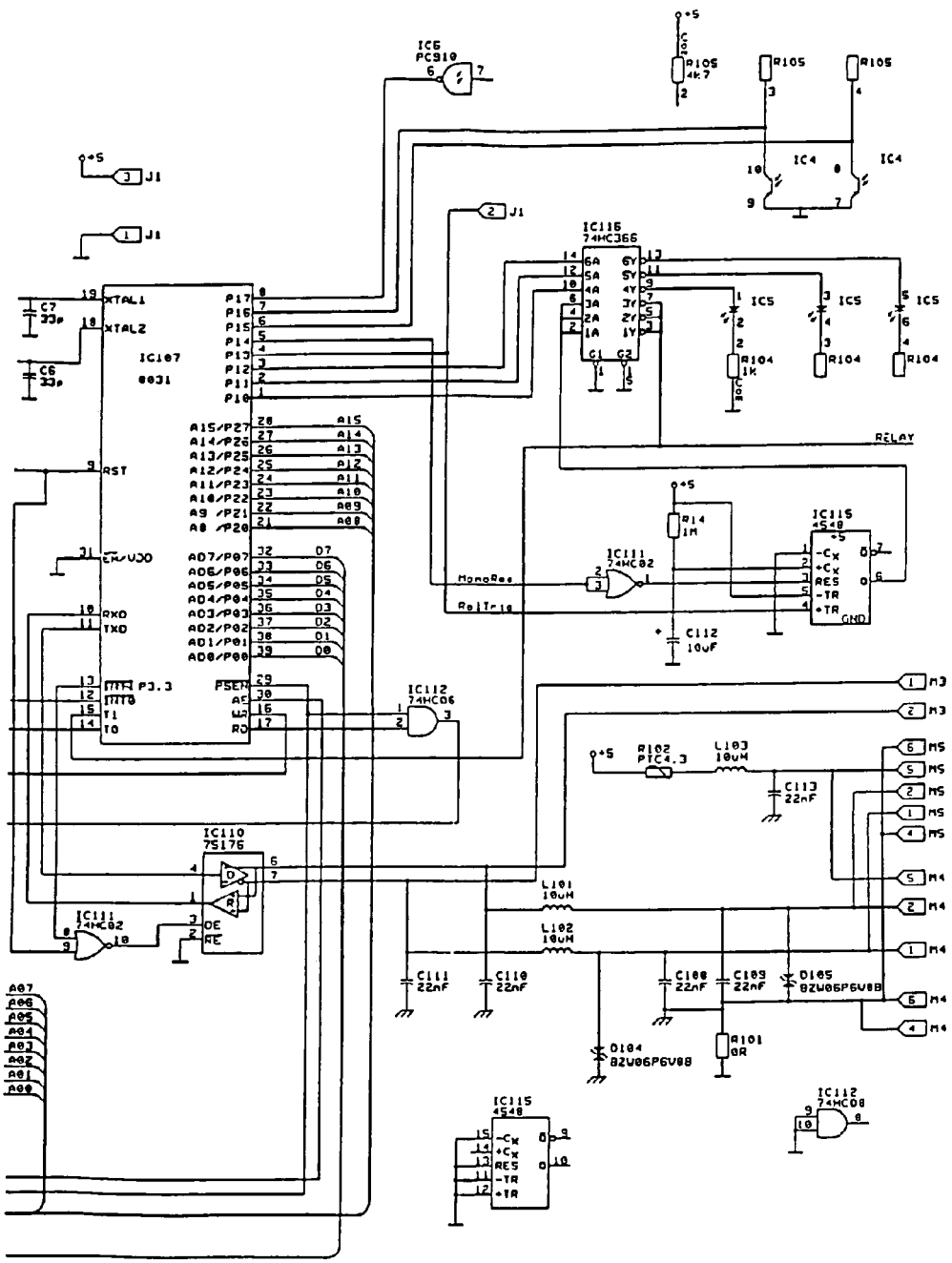

FIGS. 14a and 14b show a circuit diagram of a controller section of the presently preferred embodiment of the controller and power supply unit 30.

Figure 15A:
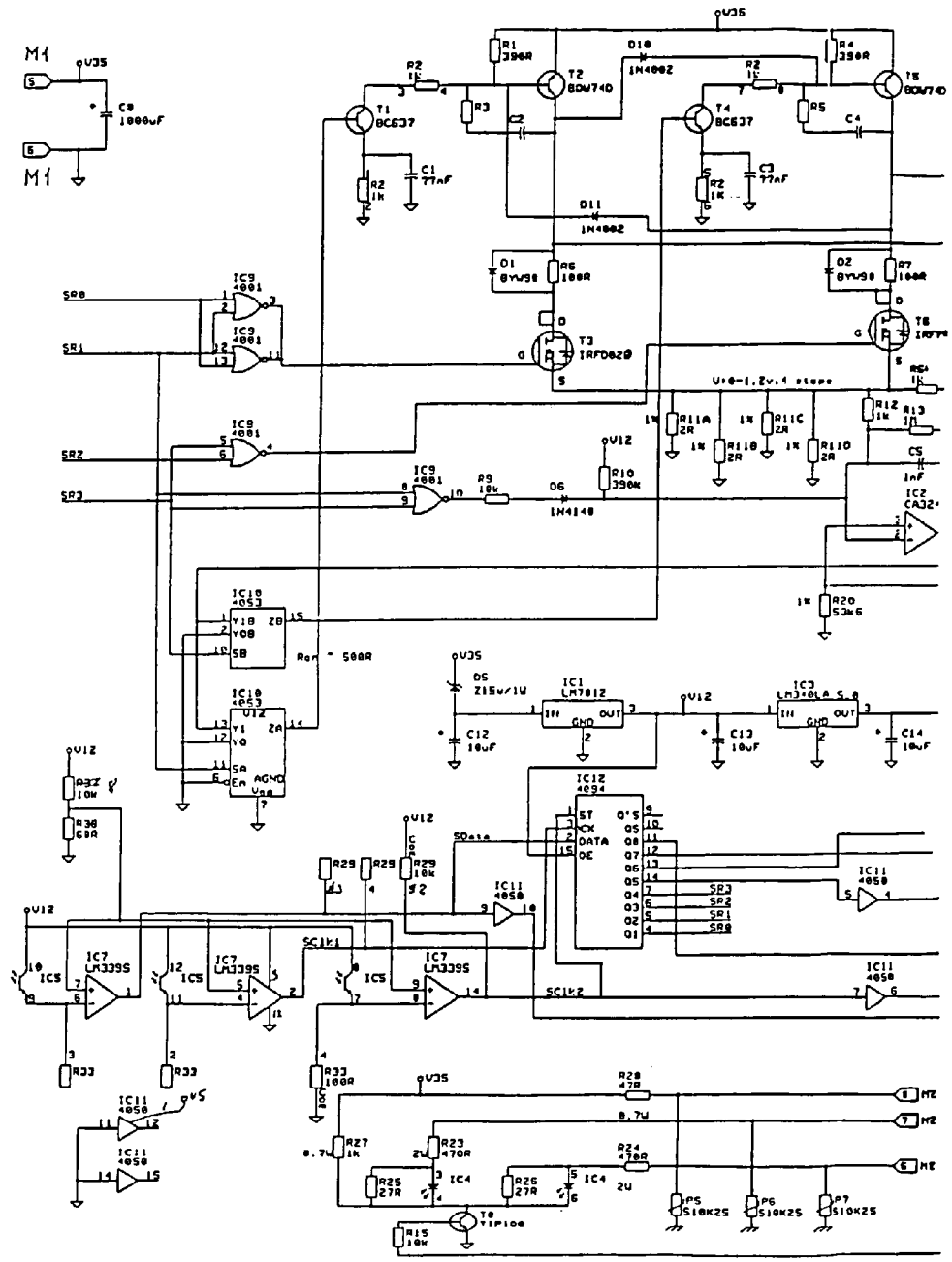
FIGS. 15a and 15b show a circuit diagram of a power output stage included in a controller and power supply unit according to a preferred embodiment of the present invention.
Figure 15B:
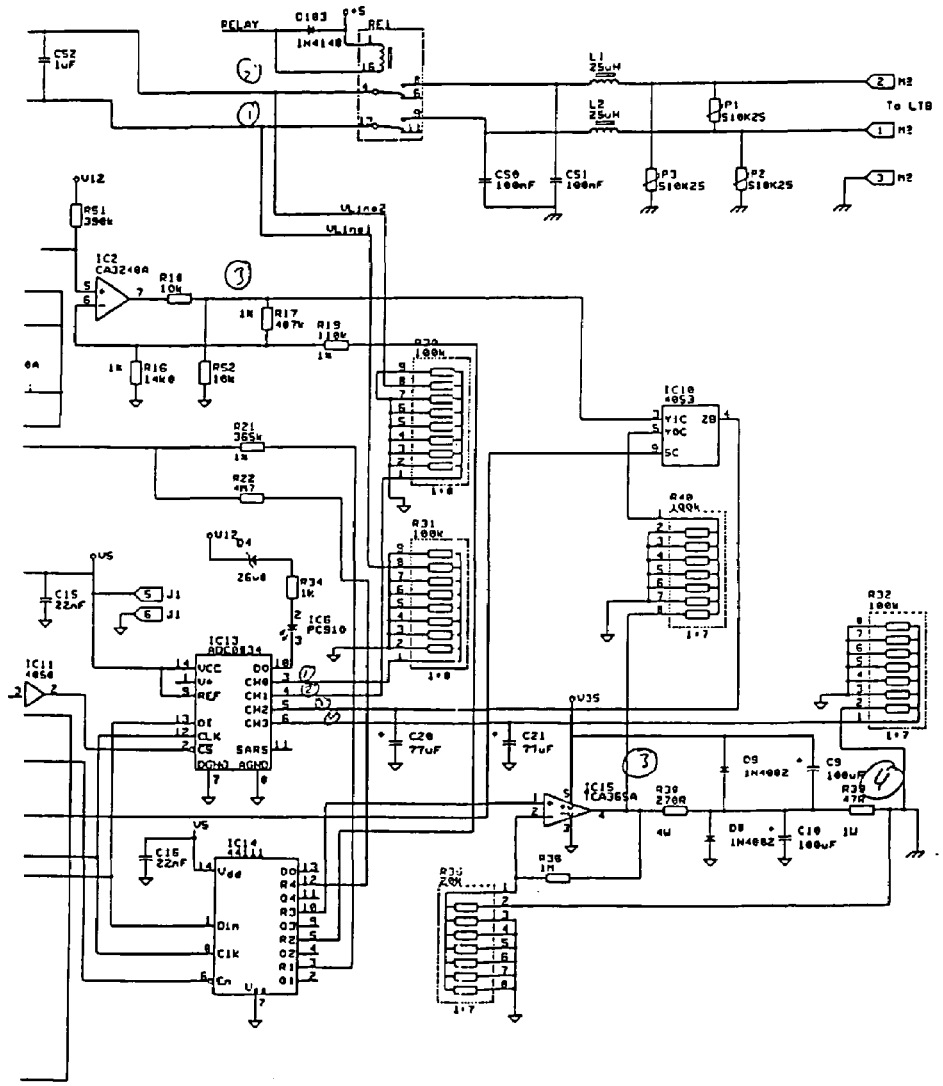

FIGS. 15a and 15b show a circuit diagram of power supply section of the presently preferred embodiment of the controller and power supply unit 30.

Figure 16A:
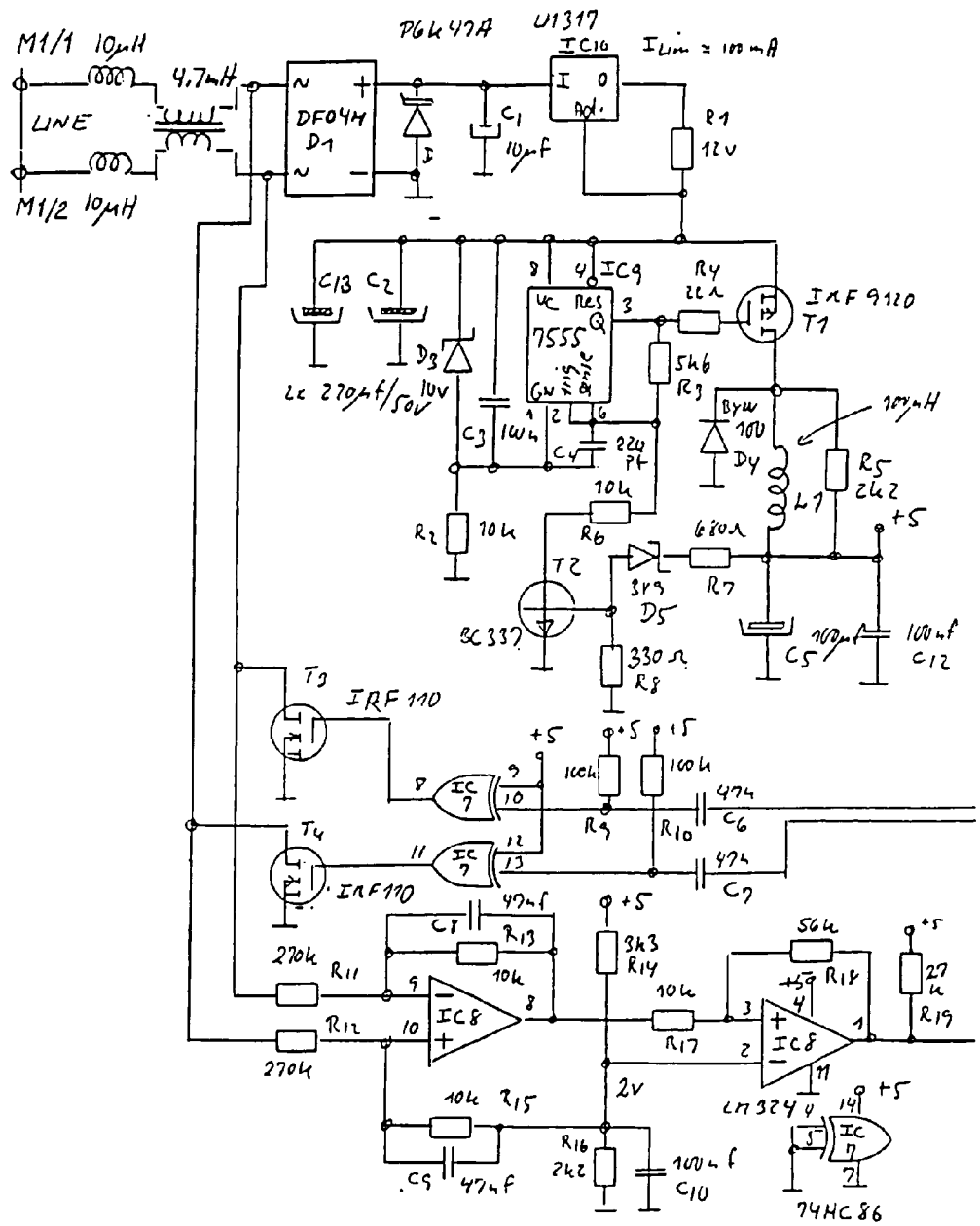
FIGS. 16a and 16b show a circuit diagram of a mark sender according to a preferred embodiment of the present invention.
Figure 16B:
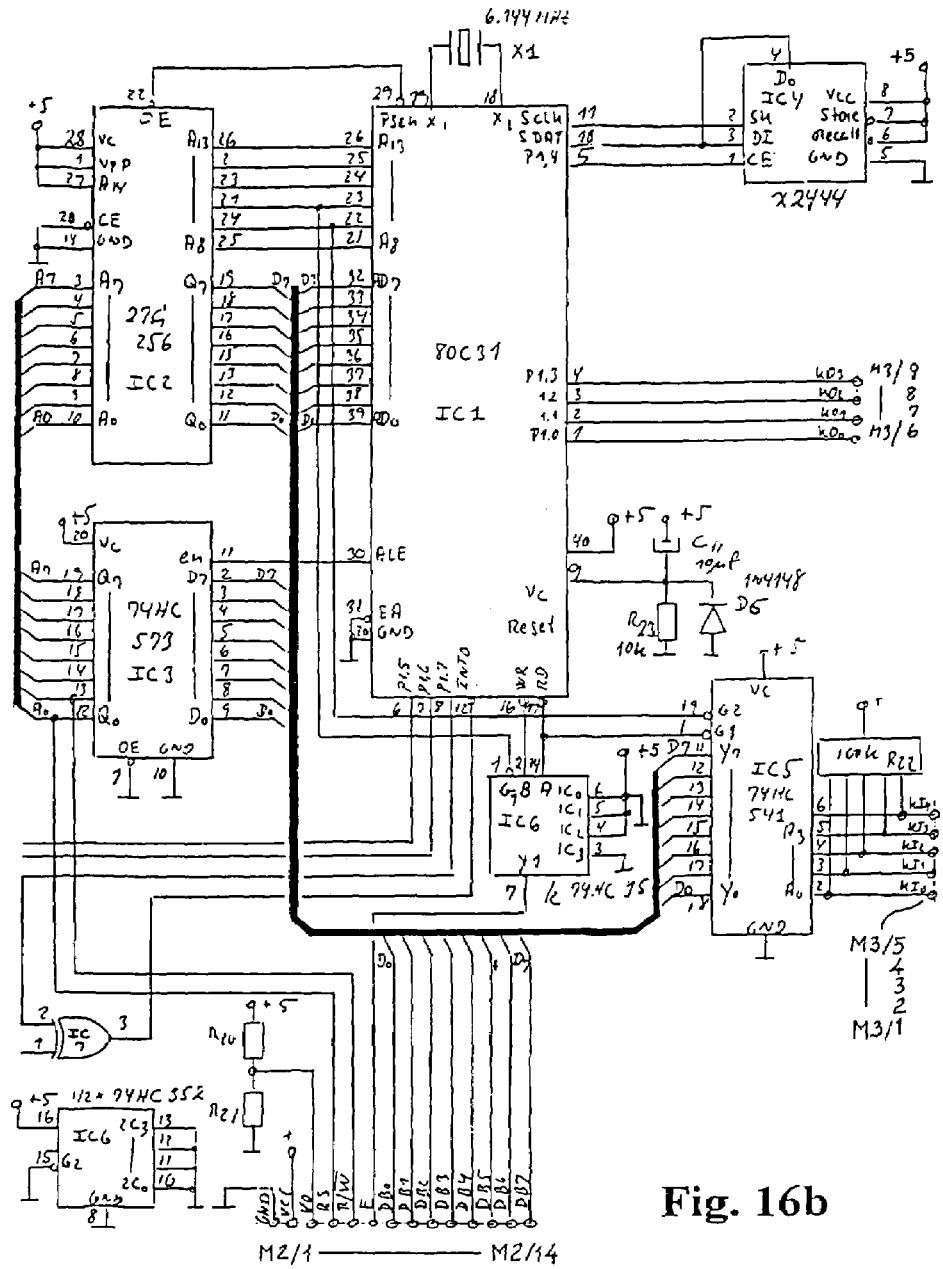

FIGS. 16a and 16b show a circuit diagram of a mark sender for transmitting start information to the controllable irrigation valves 42, irrespective of the schedules of instructions of the controller and power supply unit 30. The mark sender provides the opportunity for manually control the controllable irrigation valves 42 to open or close and thereby provide an operator the possibility to manually adjust the irrigation during inspection of, for example, a golf course.

In the above-described two-wire controlling and monitoring system, the controller and supply unit 30 supplies a specific schedule of instructions to the two-wire cable 28 for addressing a specific decoder. After the transmission of the specific schedule of instructions to the intentional receiver of the schedule of instructions being a specific decoder, the controller and power supply unit has to carry out the above described "arbitration" in order to obtain information regarding safe receipt of the schedule of instructions and also regarding the performance of the instruction, i.e. information relating to the decoder performing the intentional action or not performing the intentional action. If all instructions are to be verified by the above "arbitration", approximately 50% of the information band will be used for the recognition and verification of receipt and the performing of a specific instruction. In order to allow a simpler confirmation of receipt, or in the alternative not-receipt of the intentional information or schedule of instructions by a specific intentional receiving decoder, dedicated time frames are included in the transmission window, as is illustrated in FIGS. 17a-17c and 18a-18c.

In FIG. 17a, a conventional transmission of a schedule of instructions 118 by the alternating of the DC power supply output is shown, which alternating periods have a duration of 100-400 milliseconds.

After the transmission of the specific schedule of instructions, the stop signal represented by the pulse 124 is transmitted, indicating to the receiving decoders the termination of the transmission of a schedule of instructions. The stop signal 124 shown in FIG. 17a has duration of 60 milliseconds, and it is terminated by a reversal of the polarity of the signals of the two-wire cable. Within the next full period designated the reference numeral 119, a pause is established for the initial 200 milliseconds, allowing any transients or disturbances to be eliminated or to die out. In the 200 millisecond pause, two time frames designated by reference numerals 72' and 72", representing the supply of minimum current from the controller and power supply unit to the two-wire cable, are indicated in FIG. 17a, within which time frames a not-acknowledgement signal shown in FIG. 17c or an acknowledgement signal shown in FIG. 17b may be transmitted from the intentional receiving decoder to the controller and power supply unit by short circuiting the two-wire cable, and doing so establishes the above-described signalling to the controller and power supply unit. According to the diagrams of FIGS. 17a-17c, the not-acknowledgement signal shown in FIG. 17c is transmitted within the time frame 72', approximately 100 milliseconds after the stop signal pulse 124, whereas the acknowledgement signal is transmitted within the time frame 72", approximately 120 milliseconds after the stop signal pulse 124.

Preferably, the not-acknowledgement signal is transmitted prior to the acknowledgement signal for allowing the controller and power supply unit to positively recognize, by the receipt of the not-acknowledgement signal, that a retransmission has to be made. However, in an alternative embodiment of the signalling technique illustrated in FIG. 17a-17c, the acknowledgement signal may be transmitted prior to any not-acknowledgement signal, allowing the controller and power supply unit to recognize, by the receipt of the acknowledgement signal, that no retransmission need to be made. At any rate, the controller and power supply unit determines, on the basis of the receipt of an acknowledgement signal or a not-acknowledgement signal or no signals at all, whether or not a retransmission is to be made. Alternatively, the above time frames 72' and 72" may be changed relative to the overall length of the period 119, i.e. different from the above described 100 milliseconds and 120 milliseconds.

In FIGS. 18a- 18c, a different technique of signalling receipt or not-receipt of a schedule of instructions from an intentional receiving decoder is illustrated. As distinct from the first and presently preferred embodiment of the acknowledgement/not-acknowledgement technique shown in FIG. 17a-17c, the technique illustrated in FIGS. 18a-18c includes no specific 60 millisecond stop signal pulse 124 as the intentional receiving decoder simply after the transmission of the schedule of instructions 118 starts signalling the not-acknowledgement or the acknowledgement of the schedule of instructions by transmitting the not-acknowledgement signal within the time frame 72', as illustrated in FIG. 18c, approximately 160 milliseconds after the schedule of instructions pulse 118 or, in the alternative, by transmitting the acknowledgement signal within the time frame 72' as illustrated in FIG. 18b after approximately 180 milliseconds.

Like the above described first and presently preferred signal and technique described with reference to FIG. 17a-17c, the occurrence of the acknowledgement and the not-acknowledgement signals may be reversed, as the acknowledgement signal may be transmitted within the time frame 72', whereas the not-acknowledgement signal may be transmitted within the time frame 72", and the above described periods of 160 milliseconds and 180 milliseconds may also be amended.

Generally, the transmission of the acknowledgement or not-acknowledgement signals from the intentional receiving decoder to the controller and power supply unit improves the overall efficiency of the two-wire controlling and monitoring system by reducing the time needed for verifying proper or improper receipt of a schedule of instructions to a single transmission pulse.

In the two-wire controlling and monitoring system, the acknowledgement or not-acknowledgement signalling technique may further be employed for additional signalling purposes, such as signalling from a sensor decoder the correspondence or lack of correspondence between the intentional state of a unit or an entity monitored by the sensor decoder, and the actual state of the unit or entity monitored by the sensor decoder, such as, e.g., the state of a valve or a pump.

EXAMPLE

The sensor decoder 52 shown in FIG. 11 and as described above was implemented in a prototype version from the following components.

| Fuse | |
|---|---|
| P1 | 230 V |
| Resistors: | |
| R1 | 46R4 |
| R2 | 46R4 |
| R3 | 100K |
| R4 | 86K6 |
| R5 | 100K |
| R6 | 100K |
| R7 | 100K |
| R8 | 10K |
| R9 | 150K |
| R10 | 768K |
| R11 | 22K1 |
| R12 | 100K |
| R13 | 39K |
| R14 | 39R2 |
| R15 | 10K |
| R16 | 39K |
| R17 | 39K |
| R18 | 10K |
| R19 | 39K |
| R20 | 39K |
| R21 | 86K6 |
| R22 | 4R7 |
| R23 | 10K |
| R24 | 10K |
| R25 | 10K |
| R26 | 10K |
| R27 | 470K |
| R28 | 470K |
| R29 | 56K |
| R30 | 39K |
| R31 | 27K1 |
| R32 | 39K |
| R33 | 56K |
| R34 | 100K |
| R35 | 2K49 |
| R36 | 825R |
| R37 | 2R2 |
| R38 | 39K |
| Capacitors | |
| C1 | 1000μ |
| C2 | 10n |
| C3 | 100n |
| C4 | 10μ |
| C5 | 33p |
| C6 | 33p |
| C7 | 1n |
| C8 | 1n |
| C9 | 100n |
| C10 | 100n |
| C11 | 1n |
| C12 | 1n |
| C13 | 1n |
| Diodes | |
| D1 | DF04S |
| D2 | 10 V |
| D3 | BYD17D |
| D4 | BYD17D |
| D5 | BYD17D |
| D6 | BYD17D |
| D7 | 6V8 |
| D8 | LL4148 |
| D9 | LL4148 |
| D10 | 3V2 |
| D11 | 22 V |
| D12 | 22 V |
| D13 | 15 V |
| Transistors | |
| Q1 | TIP122 |
| Q2 | BC856 |
| Q3 | BC846 |
| Q4 | BC856 |

-continued

| | |
|---|---|
| Q5 | BC846 |
| Q6 | MJD6039 |
| Q7 | MJD6039 |
| Integrated Circuits and Crystal | |
| IC1 | ST6220 |
| IC2 | 93C05 |
| IC3 | LM317LM |
| IC4 | LM358N |
| IC5 | LMC662C |
| X1 | 6.144 MHz |

The line decoder 44 shown in FIG. 12 and as described above was implemented in a prototype version from the following components.

| Fuse | |
|---|---|
| P1 | 200 mA |
| Resistors: | |
| R1 | 470K |
| R2 | 100K |
| R3 | 100K |
| R4 | 680K |
| R5 | 100K |
| R6 | 68K |
| R7 | 56K |
| R8 | 470K |
| R9 | 1K |
| R10 | 33K |
| R11 | 1M |
| R12 | 470K |
| R13 | 1K |
| R18 | 1K |
| R19 | 3K3 |
| Capacitors | |
| C1 | 3n3 |
| C2 | 3n3 |
| C3 | 3n3 |
| C4 | 10μ |
| C5 | 10μ |
| C6 | 1000μ |
| C7 | 3n3 |
| Diodes | |
| D1 | DF04S |
| D2 | BZX84-10V |
| D3 | LL4148 |
| D4 | MLL4690 |
| D5 | BYD17D |
| D6 | BYD17D |
| Transistors | |
| Q1 | BC856B |
| Q2 | BC856B |
| Q3 | 2SB1214 |
| Q4 | 2SB1817 |
| Integrated Circuits | |
| IC1 | μPD7556 |
| IC2 | 93C06 |

The line decoder 44 shown in FIG. 12 and as described above was implemented in a prototype version from the following components.

| Resistors: | |
|---|---|
| R1 | 470K |
| R2 | 100K |
| R3 | 100K |
| R4 | 680K |
| R5 | 100K |
| R6 | 68K |
| R7 | 56K |
| R8 | 470K |
| R9 | 1K |
| R10 | 33K |
| R11 | 1M |
| R12 | 68K |
| R13 | 1K |
| R14 | 3K3 |
| R15 | 3K3 |
| R16 | 3K3 |
| R17 | 3K3 |
| R18 | 1K |
| R19 | 3K3 |
| Capacitors | |
| C1 | 3n3 |
| C2 | 3n3 |
| C3 | 2200µ |
| C4 | 10µ |
| C5 | 1µ |
| Diodes | |
| D1 | DF04S |
| D2 | BZX84-10V |
| D3 | LL4148 |
| D4 | MLL4690 |
| D5 | BYD17D |
| D6 | BYD17D |
| D7 | BYD17D |
| D8 | BYD17D |
| D9 | BYD17D |
| D10 | BYD17D |
| D11 | BYD17D |
| D12 | BYD17D |
| D13 | BYD17D |
| D14 | BYD17D |
| D15 | BYD17D |
| D16 | BYD17D |
| D17 | BYD17D |
| Transistors | |
| Q1 | BC856B |
| Q2 | BC855B |
| Q3 | 2SB1214 |
| Q4 | 2SB1214 |
| Q5 | 2SB1214 |
| Q6 | 2SB1214 |
| Q7 | MJD6039 |
| Q8 | 2SB1214 |
| Q9 | 2SB1214 |
| Integrated Circuits | |
| IC1 | µPD7556 |
| IC2 | 93C06 |

The microprocessor and storage section shown in FIG. 14a and 14b and as described above was implemented in a prototype version from the following components.

| Resistors: | |
|---|---|
| R105 | 4K7 |
| R104 | 1K |
| R14 | 1M |
| R4 | 680K |
| R102 | PTC4.3 |
| R101 | 0R |

| Capacitors and Inductors | |
|---|---|
| C101 | 100µ |
| C103 | 100n |
| C104 | 100n |
| C105 | 100n |
| C106 | 100n |
| C107 | 100n |
| C108 | 22n |
| C109 | 22n |
| C110 | 22n |
| C111 | 22n |
| C112 | 10µ |
| C113 | 22n |
| C6 | 33p |
| C7 | 33p |
| L101 | 10µ |
| L102 | 10µ |
| L103 | 10µ |
| Diodes | |
| D1 | ICTE5 |
| D104 | BZW06P6V8B |
| D105 | BZW06P6V8B |
| Integrated Circuits and Crystal | |
| IC101 | 27256 |
| IC102 | 62256 |
| IC103 | 6264 |
| IC104 | 6264 |
| IC106 | 74HC138 |
| IC107 | 8031 |
| IC108 | 74HC573 |
| IC110 | 75175 |
| IC111 | 74HC02 |
| IC112 | 74HC08 |
| IC115 | 4548 |
| IC116 | 74HC366 |
| IC4 | PC812 |
| IC5 | PC813 |
| IC6 | PC910 |
| X1 | 11.0592 |

The power output stage shown in FIGS. 15a and 15b and as described above was implemented in a prototype version from the following components.

| Resistors: | |
|---|---|
| R1 | 390R |
| R2 | 1K |
| R3 | Not Used |
| R4 | 390R |
| R5 | Not Used |
| R6 | 100R |
| R7 | 100R |
| R8 | 10K |
| R9 | 18K |
| R10 | 390K |
| R11A | 2R |
| R11B | 2R |
| R11C | 2R |
| R11D | 2R |
| R12 | 1K |
| R13 | 1M |
| R15 | 10K |
| R16 | 14K |
| R17 | 487K |
| R18 | 10K |
| R19 | 110K |
| R20 | 53K6 |
| R21 | 365K |
| R22 | 4R7 |
| R23 | 470R |
| R24 | 470R |

-continued

| | |
|---|---|
| R25 | 27R |
| R26 | 27R |
| R27 | 1K |
| R28 | 47R |
| R29 | 10K |
| R30 | 100K |
| R31 | 100K |
| R32 | 100K |
| R33 | 100R |
| R34 | 1K |
| R35 | 20K |
| R36 | 1M |
| R37 | 68R |
| R38 | 270R |
| R39 | 47R |
| R40 | 100K |
| R51 | 390K |
| R52 | 10K |
| R53 | 1K |
| P1 | S10K25 |
| P2 | S10K25 |
| P3 | S10K25 |
| P5 | S10K25 |
| P6 | S10K25 |
| P7 | S10K25 |
| Capacitors and Inductors | |
| C1 | Not Used |
| C2 | Not Used |
| C3 | Not Used |
| C4 | Not Used |
| C5 | 1n |
| C8 | 1000μ |
| C9 | 100μ |
| C10 | 100μ |
| C12 | 10μ |
| C13 | 10μ |
| C14 | 10μ |
| C15 | 22n |
| C16 | 22n |
| C20 | Not Used |
| C21 | Not Used |
| C50 | 100n |
| C51 | 100n |
| C52 | 1μ |
| L1 | 25μ |
| L2 | 25μ |
| RE1 | Relay |
| Diodes | |
| D1 | BYW98 |
| D2 | BYW98 |
| D4 | Z6V8 |
| D5 | Z15V/1W |
| D6 | 1N4148 |
| D8 | 1N4002 |
| D9 | 1N4002 |
| D10 | 1N4002 |
| D11 | 1N4002 |
| D103 | 1N4148 |
| Transistors | |
| T1 | BC637 |
| T2 | BDW74D |
| T3 | IRFD02 |
| T4 | BC637 |
| T5 | BDW74D |
| T6 | IRFD02 |
| T8 | TIP100 |
| Integrated Circuits | |
| IC1 | LM7812 |
| IC2 | CA3240A |
| IC3 | LM340LA |
| IC7 | LM3395 |
| IC9 | 4001 |
| IC10 | 4053 |
| IC11 | 4094 |
| IC12 | 4094 |

-continued

| | |
|---|---|
| IC13 | ADC0834 |
| IC14 | 44111 |
| IC15 | TCA365A |

The mark sender shown in FIGS. 16a and 16b and as described above was implemented in a prototype version from the following components.

| | |
|---|---|
| Resistors: | |
| R1 | 12R |
| R2 | 10K |
| R3 | 5K6 |
| R4 | 22R |
| R5 | 2K2 |
| R6 | 10K |
| R7 | 680R |
| R8 | 330R |
| R9 | 100K |
| R10 | 100K |
| R11 | 270K |
| R12 | 270K |
| R13 | 10K |
| R14 | 3K3 |
| R15 | 10K |
| R16 | 2K2 |
| R17 | 10K |
| R18 | 56K |
| R19 | 27K |
| R20 | 10K |
| R21 | 1K |
| R22 | 100K |
| R23 | 10K |
| Capacitors and Inductors | |
| C1 | 10μ |
| C2 | 220μ |
| C3 | 100n |
| C4 | 220p |
| C5 | 100μ |
| C6 | 47n |
| C7 | 47n |
| C8 | 47n |
| C9 | 47n |
| C10 | 100n |
| C11 | 10μ |
| C12 | 100n |
| C13 | 220μ |
| L1 | 100μ |
| Diodes | |
| D1 | DFO4M |
| D2 | P6KE47A |
| D3 | 10 V |
| D4 | BYW100 |
| D5 | 3V9 |
| D6 | 1N4148 |
| Transistors | |
| T1 | IRF9120 |
| T2 | BC337 |
| T3 | IRF110 |
| T4 | IRF110 |
| Integrated Circuits and Crystal | |
| IC1 | 80C31 |
| IC2 | 26G256 |
| IC3 | 74HC573 |
| IC4 | X2444 |
| IC5 | 74HC541 |
| IC6A | 74HC95 |
| IC6B | 74HC352 |
| IC7 | 74HC86 |
| IC8 | LM324 |
| IC9 | 7555 |

-continued

| IC10 | LM317 |
|---|---|
| X1 | 6.144 MHz |

The invention claimed is:

1. A two-wire controlling and monitoring system for irrigation of localized areas of soil, the system comprising:
   a water pipeline providing water to said localized areas of soil:
   a plurality of controllable irrigation valves each positioned at a specific area of said localized areas of soil, communicating with said water pipeline, providing watering of said specific area controlled by said controlling and monitoring system and having a pair of valve control inputs;
   a plurality of localized irrigation control units each comprising a line decoder having a pair of valve control outputs connected to said pair of valve control inputs of a specific controllable irrigation valve of said first plurality of controllable irrigation valves for providing valve control signals to said first plurality of controllable irrigation valves, said line decoders further each having a pair of control and power supply inputs:
   a controller and power supply unit having a set of schedules of instructions and having a pair of control and power outputs supplying power by applying a first alternating DC voltage signal defining a maximum voltage first pulse having a first pulse width and defining a minimum voltage second pulse having a second pulse width to one of said pair of control and power outputs, simultaneously applying a second alternating DC voltage signal similarly shaped but of inverted polarity as compared to said first alternating DC voltage signal to another of said pair of control and power outputs and applying an alternating DC current defining a maximum current third pulse having a third pulse width and defining a minimum current fourth pulse having a fourth pulse width to said pair of control and power outputs;
   a two-wire cable interconnecting said controller and power supply unit and said plurality of localized irrigation control units and connecting said pair of control and power outputs of said controller and power supply unit to said control and power supply inputs of said line decoders of said plurality of localized irrigation control units and providing said power from said controller and power supply unit to each of said plurality of localized irrigation control units;
   said controller and power supply unit transmitting said schedules of instructions to said plurality of localized irrigation control units through said two-wire cable and receiving said specific irrigation parameters from said plurality of localized irrigation control units through said two-wire cable; and
   a specific line decoder being the intentional receiver of a specific schedule of instructions responding by transmitting an acknowledgement signal to said controller and power supply unit through said two-wire cable within a first time frame of said first pulse if said specific schedule of instructions is correctly received or, alternatively, transmitting a not-acknowledgement signal to said controller and power supply unit through said two-wire cable within a second time frame of said first pulse if said specific schedule of instructions is not correctly received.

2. The two-wire controlling and monitoring system according to claim 1, said controller and power supply unit supplying a minimum current to said two-wire cable during said first and second time frames of said first pulse.

3. The two-wire controlling and monitoring system according to claim 2, said first frame being prior to said second frame.

4. The two-wire controlling and monitoring system according to claim 2, said second frame being prior to said first frame.

5. The two-wire controlling and monitoring system according to claim 1, further comprising a plurality of field sensors positioned at specific areas of said localized areas of soil, providing specific irrigation parameters and having a pair of sensor outputs; and
   said plurality of localized irrigation control units further comprising a sensor decoder having a pair of sensor inputs connected to said pair of sensor outputs of a specific field sensor of said plurality of field sensors for providing power to said plurality of field sensors and recording said specific irrigation parameters from said plurality of field sensors, and said sensor decoders further each having a pair of control and power supply inputs.

6. The two-wire irrigation controlling and monitoring system according to claim 5, wherein the valves in said plurality of controllable irrigation valves are selected from the group consisting of magnetically operated valves, electrically operated valves, hydraulically operated valves, pneumatically operated valves, and combinations thereof, and wherein the valves in said plurality of controllable irrigation valves are opened by applying an inrush signal followed by a hold signal to said pair of valve control inputs and closed by applying no signal to said pair of valve control inputs, and wherein the field sensors in said plurality of field sensors are selected from the group consisting of temperature sensors, humidity sensors, pressure sensors, low sensors, magnetic field sensors, mechanical movement sensors, mechanical strain sensors, fertilizer sensors, and any combination thereof.

7. The two-wire irrigation controlling and monitoring system according to claim 6, wherein said line decoders provide said inrush signal, said hold signal, and said no signal to said plurality of controllable irrigation valves by supplying from said pair of valve control outputs a pulsed alternating DC control signal to said pair of valve control inputs in accordance with said transmitted schedules of instructions, and wherein said pulsed alternating DC signal defines a maximum voltage in the range of 25V to 45V and a minimum voltage in the rang of 0V to 5V, and defines a line decoder output pulse width in the range of 100 μ seconds to 0.1 second, said line decoder output pulse width defining a first part having said maximum voltage and a second part having said minimum voltage, and wherein said pulsed alternating DC signal constituting said inrush signal by having said first part longer than or equal to said second part during a period in the range 10 milliseconds to 1 second and constituting said hold signal by having said first part shorter than said second part during a period determined in accordance with said schedules of instructions transmitted to said line decoder by said controller an power supply unit.

8. The two-wire irrigation controlling and monitoring system according to claim 1, wherein said water pipeline is in contact with the ground, and wherein said water pipeline is constructed from a material selected from the group consisting of plastic materials and metallic materials.

9. The two-wire irrigation controlling and monitoring system according to claim 1, said schedules of instructions being transmitted onto said two-wire system by re-scaling a selected one of said first pulse width and said second pulse width to a fifth pulse width smaller than said selected one of said first pulse width and said second pulse width and indicating a binary "1", or by re-scaling selected one of said first pulse width and said second pulse width to a sixth pulse width smaller than said selected one of said first pulse width and said second pulse width and indicating a binary "0".

10. The two-wire irrigation controlling and monitoring system according to claim 1, wherein said first alternating DC voltage signal and said second alternating DC voltage signal alternate with a frequency less than 50 Hz.

11. The two-wire irrigation controlling and monitoring system according to claim 1, wherein said first pulse width of said first alternating DC voltage signal and said second alternating DC voltage signal is in the range 100 milliseconds to 10 seconds, and wherein said second pulse width of said first alternating DC voltage signal and said second alternating DC voltage signal is in the range 100 milliseconds to 10 seconds.

12. The two-wire irrigation controlling and monitoring system according to claim 1, wherein said maximum voltage is in a range from +10V to +20V, and wherein said minimum voltage is in a range from −15V to −25V.

13. The two-wire irrigation controlling and monitoring system according to claim 1, wherein said first alternating DC voltage signal and said second alternating DC voltage signal during said first pulse width and said second pulse width averages voltages in the range −5V to −0.5V.

14. The two-wire irrigation controlling and monitoring system according to claim 1, wherein said maximum current is in the range of 0.5 A to 2 A, and wherein said minimum current is in the range 20 mA to 150 mA.

15. The two-wire irrigation controlling and monitoring system according to claim 1, wherein said third pulse width is greater than said fourth pulse width, and wherein said fourth pulse width is in the range 0.1 milliseconds to 10 milliseconds.

16. The two-wire irrigation controlling and monitoring system according to claim 1, wherein said schedules of instructions are transmitted onto said two-wire system by re-scaling a selected one of said first pulse width or said second pulse width to a fifth pulse width in the range 10 milliseconds to 49 milliseconds, indicating a binary "1", or by re-scaling a selected one of said first pulse width or said second pulse width to a sixth pulse width in the range 0.1 millisecond to 9 milliseconds, indicating binary "0", and wherein said schedules of instructions comprise a type declaration determining additional content of a transmission from said controller and power supply unit to said plurality of localized irrigation control units, said additional content being selected from the group consisting of at least one of an address of a specific designated localized irrigation control unit of said plurality of localized irrigation control units, data disclosing information regarding actions to be taken by said specific designated localized irrigation control unit of said plurality of localized irrigation control units, and wherein a first check and a second check, ensuring a safe reception of said transmission, are terminated by a stop signal having a pulse width in the range 50 milliseconds to 70 milliseconds.

17. The two-wire irrigation controlling and monitoring system according to claim 16, wherein said type declaration comprises 4 bits and provides 16 optional operations selected from the group consisting of at least one of Arbitration, Data, Control (On/Off), Broadcast, Test and Pole, and wherein said address of said specific designated localized irrigation control unit of said plurality of localized irrigation control units comprises an address transmission size in the range 0 to 128 bits, and wherein said data disclosing information regarding action to be taken by said specific designated localized irrigation control unit of said plurality of localized irrigation control units comprises a data transmission size in the range of 0 to 64 KBYTE, and wherein each of said first check and said second check ensuring a safe reception of said transmission comprises a check transmission size in the range 0 to 128 bits.

18. The two-wire irrigation controlling and monitoring system according to claim 17, wherein said controller and power supply unit comprises:
 a microprocessor;
 a storage unit configured for storing said schedules of instructions;
 an output section operable for providing power to said two-wire cable and transmitting said schedules of instruction on said two-wire cable; and
 an input section operable for monitoring a differential voltage of said two-wire cable;
 wherein said microprocessor controls said output section to apply said minimum current to said two-wire cable during an interrupt window;
 wherein each of said sensor decoders and line decoders comprises a short circuiting circuit providing (1) an interrupt signal during said interrupt window to said controller and power supply unit by unidirectionally short circuiting said pair of control and power supply inputs, hence reducing the differential voltage of said two-wire cable, and (2) a no interrupt signal by open circuiting said pair of control and power supply inputs, said interrupt signal being constituted by a voltage drop of said differential voltage of said two-wire cable in the range 5V to 35V; and
 wherein said interrupt window is initiated following DC alternation of said first alternating DC voltage signal and said second alternating DC voltage signal and a power supply period in the range 250 milliseconds to 550 milliseconds, and said interrupt window is in the range 0 to 20 milliseconds.

19. The two-wire irrigation controlling and monitoring system according to claim 18, wherein said microprocessor records said interrupt signal from at least one of said sensor decoders and said line decoders of said plurality of localized irrigation control units through said input section monitoring voltage of said two-wire cable, and subsequently operates said output section to perform a DC alternation of said first alternating DC voltage signal and said second alternating DC voltage signal, and operates said output section to terminate said interrupt window and apply said maximum current to said two-wire cable, and wherein said microprocessor, following a recording of said interrupt signal from said at least one of said sensor decoders and said line decoders of said plurality of localized irrigation control units, performs a DC alternation of said first alternating DC voltage signal and said second alternating DC voltage signal and transmits said type declaration Arbitration followed by a series of binary "1"s including an answer window for said at least one of said sensor decoders and said line decoders of said plurality of localized irrigation control units to answer to said binary "1", and wherein said answer window is initiated following a DC alternation of said first alternating DC voltage signal and said second alternating DC voltage signal and a pause period in the range of 2 milliseconds to 10 milliseconds, and said answer window is in the range of 0 to 20 milliseconds.

20. The two-wire irrigation controlling and monitoring system a according to claim 19, wherein said short circuiting circuit provides an answer signal during said answer window to said controller and power supply unit by unidirectionally short circuiting said pair of control and power supply inputs, hence reducing the differential voltage of said two-wire cable and no answer signal by open circuiting said pair of control and power supply inputs, said answer signal being constituted by a voltage drop of said differential voltage of said two-wire cable in the range of 5V to 35V, and wherein said microprocessor controls said output section to supply said minimum current to said two-wire cable during said answer window.

21. The two-wire irrigation controlling and monitoring system according to claim 20, wherein said controller and power supply unit during a declared type of transmission of schedules and instructions requests said specific irrigation parameters from an addressed sensor decoder of said plurality of localized irrigation control units, and subsequently said controller and power supply unit transmits a series of binary "1"s including said answer window for said addressed decoder to answer to said binary "1"s, and wherein said microprocessor records said answer signal from at least one sensor decoder of said plurality of localized irrigation control units through said input section monitoring said voltage of said two-wire cable and operates said output section to perform a DC alternation of said first alternating DC voltage signal and said second alternating DC voltage signal and subsequently operates said output section to terminate said answer window and to apply said maximum current to said two-wire cable, and wherein said microprocessor interprets said answer signal as an indication of a binary "0" and no answer signal as a binary "1".

22. A two-wire controlling and monitoring system for irrigation of localized areas of soil, said system comprising:
   a water pipeline providing water to said localized areas of soil;
   a plurality of controllable irrigation valves each positioned at a specific area of said localized areas of soil, communicating with said water pipeline, providing watering of said specific area of said localized areas controlled by said controlling and monitoring system of soil and having a pair of valve control inputs;
   a plurality of field sensors positioned at specific areas of said localized areas of soil, providing specific irrigation parameters and each having a pair of sensor outputs;
   a plurality of localized irrigation control units each comprising a sensor decoder having a pair of sensor inputs connected to said pair of sensor outputs of a specific field sensor of said plurality of field sensors for providing power to said plurality of field sensors and recording said specific irrigation parameters from said plurality of field sensors, said sensor decoders further each having a pair of control and power supply inputs;
   a controller and power supply unit having a set of schedules of instructions and having a pair of control and power outputs supplying power by applying a first alternating DC voltage signal defining a maximum voltage first pulse having a first pulse width and defining a minimum voltage second pulse having a second pulse width to one of said pair of control and power outputs, simultaneously applying a second alternating DC voltage signal similarly shaped but of inverted polarity as compared to said first alternating DC voltage signal to another of said pair of control and power outputs and applying an alternating DC current defining a maximum current third pulse having a third pulse width and defining a minimum current fourth pulse having a fourth pulse width to said pair of control and power outputs;
   a two-wire cable interconnecting said controller and power supply unit and said plurality of localized irrigation control units and connecting said pair of control and power outputs of said controller and power supply unit to said control and power inputs of said sensor decoders of said plurality of localized irrigation control units and providing said power from said controller and power supply unit to each of said plurality of localized irrigation control units;
   said controller and power supply unit transmitting said schedules of instructions to said plurality of localized irrigation control units through said two-wire cable and receiving said specific irrigation parameters from said plurality of localized irrigation control units through said two-wire cable; and
   a specific sensor decoder being the intentional receiver of a specific schedule of instructions responding by transmitting acknowledgement signal to said controller and power supply unit through said two-wire cable within a first time frame of said first pulse if said specific schedule of instructions is correctly received or, alternatively, transmitting a not-acknowledgement signal to said controller and power supply unit through said two-wire cable within a second time frame of said first pulse if said specific schedule of instructions is not correctly received.

23. The two-wire controlling and monitoring system according to claim 22, said controller and power supply unit supplying a minimum current to said two-wire cable during said first and second time frames of said first pulse.

24. The two-wire controlling and monitoring system according to claim 23, said first frame being prior to said second frame.

25. The two-wire controlling and monitoring system according to claim 23, said second frame being prior to said first frame.

26. The two-wire controlling and monitoring system according to claim 22, said plurality of localized irrigation control units each further comprising a line decoder having a pair of valve control outputs connected to said pair of valve control inputs of a specific controllable irrigation valve of said plurality of controllable irrigation valves, for providing valve control signals to said plurality of controllable irrigation valves, said line decoders further each having a pair of control and power supply inputs.

27. The two-wire irrigation controlling and monitoring system according to claim 22, wherein said water pipeline is in contact with the ground, and wherein said water pipeline is constructed from a material selected from the group consisting of plastic materials and metallic materials.

28. The two-wire irrigation controlling and monitoring system according to claim 22, wherein the valves in said plurality of controllable irrigation valves are selected from the group consisting of magnetically operated valves, electrically operated valves, hydraulically operated valves, pneumatically operated valves, and combinations thereof, and wherein the valves in said plurality of controllable irrigation valves are opened by applying an inrush signal followed by a hold signal to said pair of valve control inputs and closed by applying no signal to said pair of valve control inputs, and wherein the field sensors in said plurality of field sensors are selected from the group consisting of temperature sensors, humidity sensors, pressure sensors, flow sensors, magnetic field sensors, mechanical movement sensors, mechanical strain sensors, fertilizer sensors, and any combination thereof.

29. The two-wire irrigation controlling and monitoring system according to claim 28, wherein said line decoders provide said inrush signal, said hold signal, and said no signal to said plurality of controllable irrigation valves by supplying from said pair of valve control outputs a pulsed alternating DC control signal to said pair of valve control inputs in accordance with said transmitted schedules of instructions, and wherein said pulsed alternating DC signal defines a maximum voltage in the range of 25V to 45V and a minimum voltage in the range of 0V to 5V, and defines a line decoder output pulse width in the range of 100 μ seconds to 0.1 second, said line decoder output pulse width defining a first part having said maximum voltage and a second part having said minimum voltage, and wherein said pulsed alternating DC signal constituting said inrush signal by having said first part longer than or equal to said second part during a period in the range 10 milliseconds to 1 second and constituting said hold signal by having said first part shorter than said second part during a period determined in accordance with said schedules of instructions transmitted to said line decoders by said controller and power supply unit.

30. The two-wire controlling and monitoring system according to claim 22, said schedules of instructions being transmitted onto said two-wire system by re-scaling a selected one of said first pulse width and said second pulse width to a fifth pulse width smaller than said selected one of said first pulse width and said second pulse width and indicating a binary "1", or by re-scaling a selected one of said first pulse width and said second pulse width to a sixth pulse smaller than said selected one of said first pulse width and said second pulse width and indicating a binary "0".

31. The two-wire irrigation controlling and monitoring system according to claim 22, wherein said first alternating DC voltage signal and said second alternating DC voltage signal alternate with a frequency less than 50 Hz.

32. The two-wire irrigation controlling and monitoring system according to claim 22, wherein said first pulse width of said first alternating DC voltage signal and said second alternating DC voltage signal is in the range 100 milliseconds to 10 seconds, and wherein said second pulse width of said first alternating DC voltage signal and said second alternating DC voltage signal is in the range 100 milliseconds to 10 seconds.

33. The two-wire irrigation controlling and monitoring system according to claim 22, wherein said maximum voltage is in a range from +10V to +20V, and wherein said minimum voltage is in a range from −15V to −25V.

34. The two-wire irrigation controlling and monitoring system according to claim 22, wherein said first alternating DC voltage signal and said second alternating DC voltage signal during said first pulse width and said second pulse width averages voltages in the range −5V to −0.5V.

35. The two-wire irrigation controlling and monitoring system according to claim 22, wherein said maximum current is in the range of 0.5 A to 2 A, and wherein said minimum current is in the range 20 mA to 150 mA.

36. The two-wire irrigation controlling and monitoring system according to claim 22, wherein said third pulse width is greater than said fourth pulse width, and wherein said fourth pulse width is in the range 0.1 milliseconds to 10 milliseconds.

37. The two-wire irrigation controlling and monitoring system according to claim 22, wherein said schedules of instructions are transmitted onto said two-wire system by re-scaling a selected one of said first pulse width and said second pulse width to a fifth pulse width in the range 10 milliseconds to 49 milliseconds, indicating a binary "1", or by re-scaling a selected one of said first pulse width and said second pulse width to a sixth pulse width in the range 0.1 millisecond to 9 milliseconds, indicating binary "0", and wherein said schedules of instructions comprise a type declaration determining additional content of a transmission from said controller and power supply unit to said plurality of localized irrigation control units, said additional content being selected from the group consisting of at least one of an address of a specific designated localized irrigation control unit of said plurality of localized irrigation control units, data disclosing information regarding actions to be taken by said specific designated localized irrigation control unit of said plurality of localized irrigation control units, and wherein first check and a second check, ensuring a safe reception of said transmission, are terminated by a stop signal having a seventh pulse width in the range 50 milliseconds to 70 milliseconds.

38. The two-wire irrigation controlling and monitoring system according to claim 37, wherein said type declaration comprises 4 bits and provides 16 optional operations selected from the group consisting of at least one of Arbitration, Data, Control (On/Off), Broadcast, Test and Pole, and wherein said address of said specific designated localized irrigation control unit of said plurality of localized irrigation control units comprises an address transmission size in the range 0 to 128 bits, and wherein said data disclosing information regarding actions to be taken by said specific designated localized irrigation control unit of said plurality of localized irrigation control units comprises a data transmission size in the range of 0 to 64 KBYTE, and wherein each of said first check and said second check ensuring a safe reception of said transmission comprises a check transmission size in the range 0 to 128 bits.

39. The two-wire irrigation controlling and monitoring system according to claim 38, wherein said controller and power supply unit comprises:
a microprocessor;
a storage unit configured for storing said schedules of instructions;
an output section operable for providing power to said two-wire cable and transmitting said schedules of instruction on said two-wire cable;
and an input section operable for monitoring a differential voltage of said two-wire cable;
wherein said microprocessor controls said output section to apply said minimum current to said two-wire cable during an interrupt window;
wherein each of said sensor decoders and line decoders comprises a short circuiting circuit providing (1) an interrupt signal during said interrupt window to said controller and power supply unit by unidirectionally short circuiting said pair of control and power supply inputs, hence reducing the differential voltage of said two-wire cable, and (2) a no interrupt signal by open circuiting said pair of control and power supply inputs, said interrupt signal being constituted by a voltage drop of said differential voltage of said two-wire cable in the range 5V to 35V; and
wherein said interrupt window is initiated following a DC alternation of said first alternating DC voltage signal and said second alternating DC voltage signal and power supply period in the range 250 milliseconds to 550 milliseconds, and said interrupt window is in the range 0 to 20 milliseconds.

40. The two-wire irrigation controlling and monitoring system according to claim 39, wherein said microprocessor records said interrupt signal from at least one of said sensor decoders and said line decoders of said plurality of localized irrigation control units through said input section monitoring voltage of said two-wire cable, and subsequently operates said output section to perform a DC alternation of said first alternating DC voltage signal and said second alternating DC voltage signal, and operates said output section to terminate said interrupt window and apply said maximum current to said two-wire cable, and wherein said microprocessor, following a recording of said interrupt signal from said at least one of said sensor decoders and said line decoders of said plurality of localized irrigation control units, performs DC alternation of said first alternating DC voltage signal and said second alternating DC voltage signal and transmits said type declaration Arbitration followed by a series of binary "1"s including an answer window for said at least one of said sensor decoders and said line decoders of said plurality of localized irrigation control units to answer to said binary "1", and wherein said answer window is initiated following a DC alternation of said first alternating DC voltage signal and said second alternating DC voltage signal and a pause period in the range of 2 milliseconds to 10 milliseconds, and said answer window is in the range of 0 to 20 milliseconds.

41. The two-wire irrigation controlling and monitoring system according to claim 40, wherein said short circuiting circuit provides an answer signal during said answer window to said controller and power supply unit by unidirectionally short circuiting said pair of control and power supply inputs, hence reducing the differential voltage of said two-wire cable and no answer signal by open circuiting said pair of control and power supply inputs, said answer signal being constituted by a Voltage drop of said differential voltage of said two-wire cable in the range of 5V to 35V, and wherein said microprocessor controls said output section to supply said minimum current to said two-wire cable during said answer window.

42. The two-wire irrigation controlling and monitoring system according to claim 41, wherein said controller and power supply unit during a declared type of transmission of schedules and instructions requests said specific irrigation parameters from an addressed sensor decoder of said plurality of localized irrigation control units, and subsequently said controller and power supply unit transmits a series of binary "1"s including said answer window for said addressed decoder to answer to said binary "1"s, and wherein said microprocessor records said answer signal from at least on sensor decoder of said plurality of localized irrigation control units through said input section monitoring said voltage of said two-wire cable and operates said output section to perform a DC alternation of said first alternating DC voltage signal and said second alternating DC voltage signal and subsequently operates said output section to terminate said answer window and to apply said maximum current to said two-wire cable, and wherein said microprocessor interprets said answer signal as an indication of a binary "0" and no answer signal as a binary "1".

43. A method for controlling and monitoring in particular irrigation of localized areas of soil and comprising the following steps of:
providing water to said localized areas of soil through a water pipeline; controlling a discharge or supply of water from said water pipeline, providing watering of a specific area of said localized areas of soil through a plurality of controllable irrigation valves each positioned at said specific area of said localized areas of soil, and each of said plurality of controllable irrigation valves having a pair of valve control inputs;
measuring specific irrigation parameters through a plurality of field sensors positioned at specific areas of said localized areas of soil, and each of said plurality of field sensors having a pair of sensor outputs;
transmitting control signals to said plurality of controllable irrigation valves and said plurality of field sensors though a plurality of localized irrigation control units, each comprising a sensor decoder and a line decoder, providing valve control signals to said plurality of controllable irrigation valves and recording said specific irrigation parameters from said plurality of field sensors, each of said plurality of localized irrigation control units having a pair of valve control outputs connected to said pair of valve control inputs of a specific controllable irrigation valve of said plurality of controllable irrigation valves and a pair of sensor inputs connected to said pair of sensor outputs of a specific field sensor of said plurality of field sensors and having a pair of control and power supply inputs;
providing a set of schedules of instructions by means of a controller and power supply unit having a pair of control and power outputs supplying power by applying a first alternating DC voltage signal defining a maximum voltage first pulse having a first pulse width and defining a minimum voltage second pulse having a second pulse width to one of said pair of control and power outputs, simultaneously applying a second alternating DC voltage signal similarly shaped but of inverted polarity as compared to said first alternating DC voltage signal to another of said pair of control and power outputs and applying an alternating DC current defining a maximum current third pulse having a third pulse width and defining a minimum current fourth pulse having a fourth pulse width to said pair of control and power outputs;
providing a two-wire cable, interconnecting said controller and power supply unit and said plurality of localized irrigation control units through a two-wire cable connecting said pair of control and power outputs of said controller and power supply unit to said control and power inputs of said plurality of localized irrigation control units and providing said power from said control and power unit to each of said plurality of localized irrigation control units;
transmitting said schedules of instructions from said controller and power supply unit to said plurality of localized irrigation control units through said two-wire cable and receiving said specific irrigation parameter from said plurality of localized irrigation control units through said two-wire cable; and
transmitting from an irrigation control unit being the intentional receiver of a specific schedule of instructions an acknowledgement signal to said controller and power supply unit through said two-wire cable within first time frame of said first pulse, if said specific schedule of instructions is correctly received or alternatively a not-acknowledgement signal to said controller and power supply unit through said two-wire cable within a second time frame of said first pulse if said specific schedule of instructions is not correctly received.

44. The method for controlling and monitoring in particular irrigation of localized areas of soil according to claim 43, said controller and power supply unit supplying a minimum current to said two-wire cable during said first and second time frames of said first pulse.

45. The method for controlling and monitoring in particular irrigation of localized areas of soil according to claim 44, said first frame being prior to said second frame.

46. The method for controlling and monitoring in particular irrigation of localized areas of soil according to claim 44, said second frame being prior to said first frame.

* * * * *